United States Patent
Suzuki et al.

(10) Patent No.: US 11,144,114 B2
(45) Date of Patent: Oct. 12, 2021

(54) INFORMATION PROCESSING APPARATUS AND INFORMATION PROCESSING METHOD

(71) Applicant: SONY CORPORATION, Tokyo (JP)

(72) Inventors: Seiji Suzuki, Kanagawa (JP); Kentaro Ida, Tokyo (JP); Fumihiko Iida, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/609,655

(22) PCT Filed: Apr. 27, 2018

(86) PCT No.: PCT/JP2018/017151
§ 371 (c)(1),
(2) Date: Oct. 30, 2019

(87) PCT Pub. No.: WO2018/207662
PCT Pub. Date: Nov. 15, 2018

(65) Prior Publication Data
US 2020/0150750 A1    May 14, 2020

(30) Foreign Application Priority Data

May 11, 2017 (JP) ............................ JP2017-094460

(51) Int. Cl.
*A63F 13/57* (2014.01)
*G06F 3/01* (2006.01)
*G06T 19/00* (2011.01)

(52) U.S. Cl.
CPC .............. *G06F 3/011* (2013.01); *A63F 13/57* (2014.09); *G06T 19/006* (2013.01)

(58) Field of Classification Search
CPC combination set(s) only.
See application file for complete search history.

(56) References Cited

U.S. PATENT DOCUMENTS

2013/0286004 A1* 10/2013 McCulloch ........... G06T 19/006
345/419
2014/0306891 A1* 10/2014 Latta ....................... G06F 3/011
345/158

(Continued)

FOREIGN PATENT DOCUMENTS

CN    105739683 A    7/2016
EP    3040814 A1    7/2016

(Continued)

OTHER PUBLICATIONS

International Search Report and Written Opinion of PCT Application No. PCT/JP2018/017151, dated Jul. 10, 2018, 06 pages of ISRWO.

*Primary Examiner* — Temesghen Ghebretinsae
*Assistant Examiner* — Sosina Abebe
(74) *Attorney, Agent, or Firm* — Chip Law Group

(57) ABSTRACT

The present technology relates to an information processing apparatus, an information processing method, and a program for enabling an intuitive operation to be performed on a virtual object in a manner similar to that in a case of a real object. An information processing apparatus as an aspect of the present technology includes a physical property setting unit configured to set a physical property in a virtual object that can be viewed together with an operating tool and a real object existing in a real space, a positional relationship detection unit configured to detect a virtual positional relationship among the operating tool, the real object and the virtual object, and a virtual object changing unit configured to change display of the virtual object on the basis of the virtual positional relationship that is detected. The present technology may be applied to a VR system.

10 Claims, 20 Drawing Sheets

(56) References Cited

U.S. PATENT DOCUMENTS

| | | | |
|---|---|---|---|
| 2015/0022444 A1* | 1/2015 | Ooi | G06K 9/00671 |
| | | | 345/156 |
| 2016/0189427 A1 | 6/2016 | Wu et al. | |
| 2018/0158222 A1* | 6/2018 | Hayashi | G06F 3/0304 |
| 2019/0172261 A1* | 6/2019 | Alt | G06F 3/011 |
| 2019/0236849 A1* | 8/2019 | Seshita | G06T 19/20 |

FOREIGN PATENT DOCUMENTS

| | | |
|---|---|---|
| JP | 2012-069111 A | 4/2012 |
| JP | 2016-126772 A | 7/2016 |
| KR | 10-2016-0081809 A | 7/2016 |

\* cited by examiner

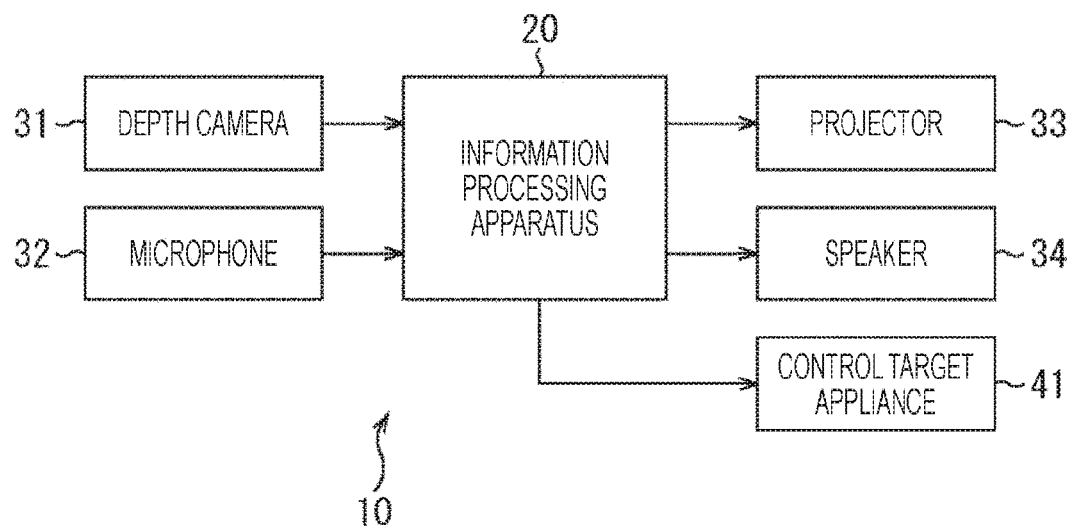
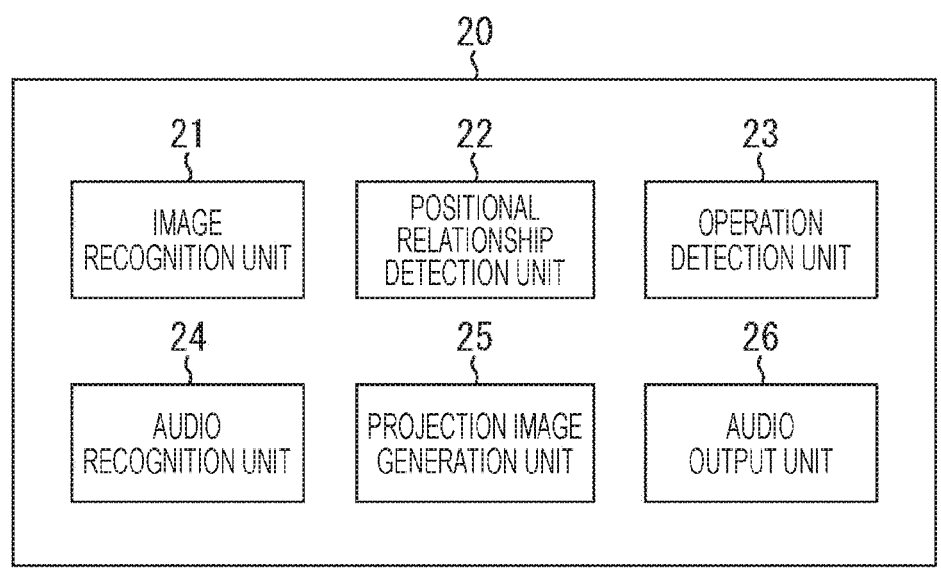

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/017151 filed on Apr. 27, 2018, which claims priority benefit of Japanese Patent Application No. JP 2017-094460 filed in the Japan Patent Office on May 11, 2017. Each of the above-referenced applications is hereby incorporated herein by reference in its entirety.

TECHNICAL FIELD

The present technology relates to an information processing apparatus, an information processing method, and a program, and more particularly, to an information processing apparatus, an information processing method, and a program for enabling expression of a physical property assumed for a virtual object.

BACKGROUND ART

In fields of so-called virtual reality (VR), augmented reality (AR) and the like, various technologies are being proposed with respect to display, in a real space, of a virtual object that does not actually exist, operation of the virtual object, and so on (see Patent Document 1, for example).

CITATION LIST

Patent Document

Patent Document 1: Japanese Patent Application Laid-Open No. 2012-69111

SUMMARY OF THE INVENTION

Problems to be Solved by the Invention

As described above, there already exist technologies related to display of a virtual object in a real space and operation of the virtual object. However, in a case where a virtual object is to be moved in response to an operation of a user, for example, unnatural expression is possibly performed compared to a case of moving a real object, with the virtual object moving at a same speed regardless of the size, for example.

The present technology has been made in view of such circumstances, and has its object to enable an intuitive operation similar to that in the case of a real object to be performed on a virtual object.

Solutions to Problems

An information processing apparatus according to an aspect of the present technology includes a physical property setting unit configured to set a physical property in a virtual object that can be viewed together with an operating tool and a real object existing in a real space, a positional relationship detection unit configured to detect a virtual positional relationship among the operating tool, the real object and the virtual object, and a virtual object changing unit configured to change display of the virtual object on the basis of the virtual positional relationship that is detected.

An information processing method according to an aspect of the present technology is an information processing method of an information processing apparatus, the method including a physical property setting step of setting a physical property in a virtual object that can be viewed together with an operating tool and a real object existing in a real space, a positional relationship detection step of detecting a virtual positional relationship among the operating tool, the real object and the virtual object, and a virtual object changing step of changing display of the virtual object on the basis of the virtual positional relationship that is detected, where the steps are performed by the information processing apparatus.

A program according to an aspect of the present technology causes a computer to function as a physical property setting unit configured to set a physical property in a virtual object that can be viewed together with an operating tool and a real object existing in a real space, a positional relationship detection unit configured to detect a virtual positional relationship among the operating tool, the real object and the virtual object, and a virtual object changing unit configured to change display of the virtual object on the basis of the virtual positional relationship that is detected.

According to an aspect of the present technology, a physical property is set in a virtual object that can be viewed together with an operating tool and a real object existing in a real space, a virtual positional relationship among the operating tool, the real object and the virtual object is detected, and display of the virtual object is changed on the basis of the virtual positional relationship that is detected.

Effects of the Invention

According to an aspect of the present technology, an intuitive operation similar to that in the case of a real object may be performed on a virtual object.

Additionally, the effects described above are not necessarily limited, and may be any of the effects described in the present disclosure.

BRIEF DESCRIPTION OF DRAWINGS

FIG. 1 is a block diagram showing an example configuration of a VR system to which the present technology is applied.

FIG. 2 is a diagram showing an example configuration of functional blocks of an information processing apparatus in FIG. 1.

MODE FOR CARRYING OUT THE INVENTION

Figure 3:
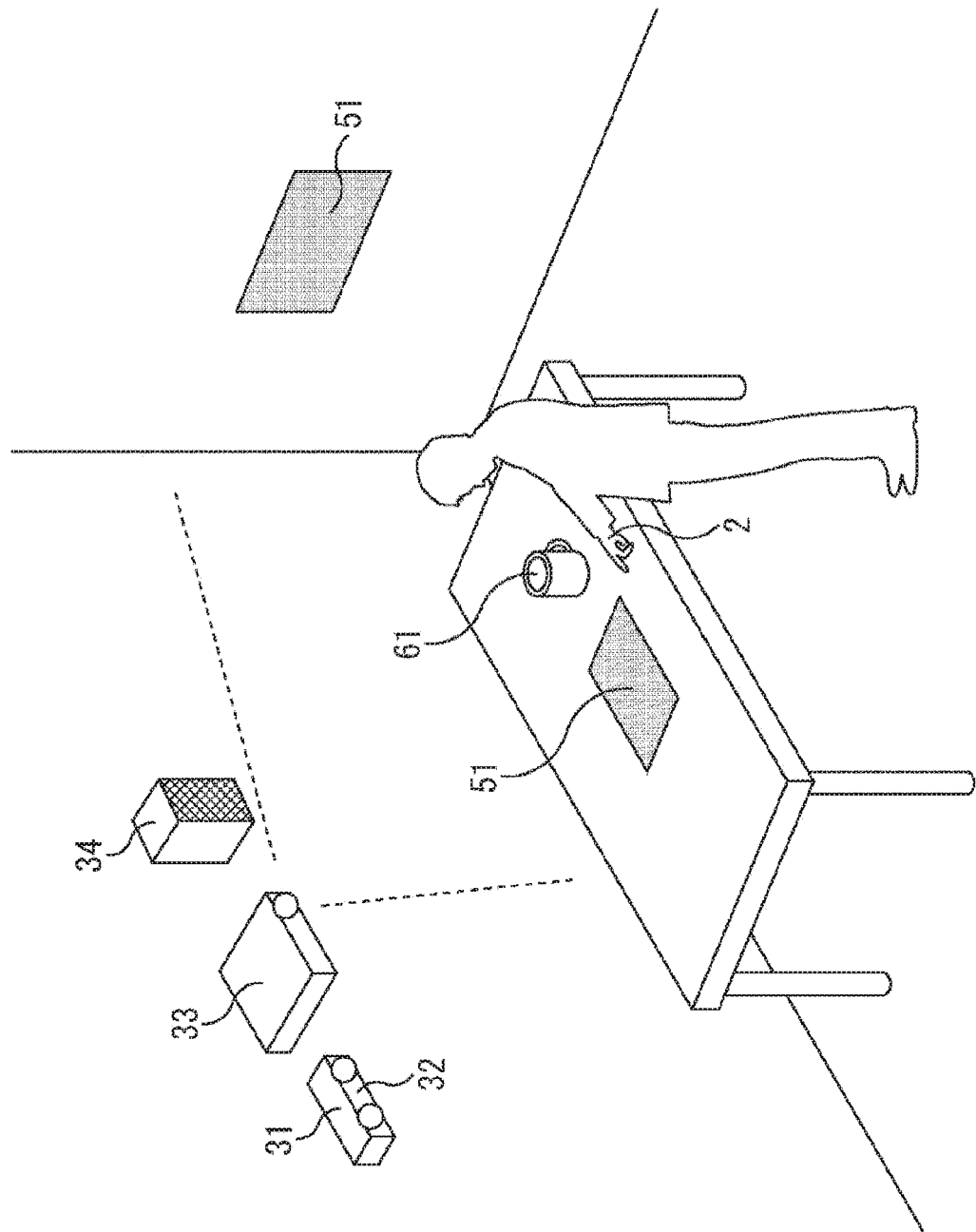
FIG. 3 is a diagram showing an example arrangement of structural elements of the VR system to which the present technology is applied.

Hereinafter, a best mode for carrying out the present technology (hereinafter referred to as "embodiment") will be described in detail in the following order with reference to the appended drawings.

1. Example Configuration of VR System as Embodiment of Present Technology
2. Functional Blocks of Information Processing Apparatus 20
3. Example Arrangement of VR System 10 in Real Space
4. Physical Property of Virtual Object 51
5. Movement of Virtual Object 51 in Response to Operation of User
6. Operation on Virtual Object 51 in which Magnetism is Set
7. Other Operations on Virtual Object 51
8. Prevention of Erroneous Display of Virtual Object 51
9. Improvement in Operability of User
10. Expected Use Cases
11. Virtual Object Control Process
12. Summary Additionally, in the present specification, a system refers to a collection of a plurality of structural elements (devices, modules (components), etc.), and whether or not all the structural elements are in a same housing is irrelevant. Accordingly, a plurality of devices that is housed in separate housings and connected through a network, and one device where a plurality of modules is housed in one housing are both a system.

<1. Example Configuration of VR System as Embodiment of Present Technology>

FIG. 1 is a block diagram showing an example configuration of a VR system as an embodiment of the present technology.

The VR system 10 includes an information processing apparatus 20, a depth camera 31, a microphone 32, a projector 33, and a speaker 34. A cable or a predetermined wireless communication standard (for example, Bluetooth (registered trademark), Wi-Fi (trademark) or the like) may be used to connect the information processing apparatus 20, the depth camera 31, the microphone 32, the projector 33, and the speaker 34 forming the VR system 10.

The information processing apparatus 20 generates a video signal for displaying a virtual object in a real space, and supplies the video signal to the projector 33. Furthermore, the information processing apparatus 20 recognizes a real object existing in the real space on the basis of a moving image signal that is supplied from the depth camera 31. The information processing apparatus 20 further recognizes an operating tool existing in the real space on the basis of the moving image signal that is supplied from the depth camera 31.

Real objects to be recognized by the information processing apparatus 20 include a wall, a floor, a ceiling, a table, a cup on the table, a user, and the like constituting a room in the real space. Here, with respect to static real objects such as the wall, the floor, the ceiling, the table and the like, information about the static real objects recognized at a beginning stage of using the VR system 10 may be updated periodically or in response to a predetermined operation of the user. Operating tools to be recognized by the information processing apparatus 20 include an instructing part of the user (for example, a fingertip, a hand, or a shadow of a hand or the like). Furthermore, the operating tool may be an object the user is holding with a hand, such as a pen or a spoon.

Furthermore, the information processing apparatus 20 may hold and use a provisional result. Then, an operation of the user on a virtual object is detected, and the virtual object is moved or deformed, for example, in response to the operation of the user. Moreover, an audio signal for generating a predetermined sound in response to the operation of the user on the virtual object, movement or deformation of the virtual object, or the like is supplied to the speaker 34.

As operations of the user on a virtual object, operations of the user pushing, pulling, twisting, and pinching a virtual object displayed on a table or the like by using an instructing part of the user (for example, a fingertip, a hand or the like) as an operating tool, and operations of the user indirectly pushing, pulling, twisting, and pinching a virtual object by using a real object, such as a cup, or another virtual object may be assumed, for example. Operations of tapping, shaking, and blowing air on a virtual object may also be assumed.

In addition to the above, operations of the user may include a gesture operation of three-dimensionally performing a predetermined movement using a hand, a head or the like in the real space, an utterance operation of uttering a predetermined keyword, and the like.

Moreover, for example, the information processing apparatus 20 is capable of controlling a home appliance such as a television (hereinafter referred to as a control target appliance 41) in response to a predetermined operation of the user on a virtual object. An infrared signal may be used for communication between the information processing apparatus 20 and the control target appliance 41, for example.

The depth camera 31 is configured by two cameras that are arranged with a predetermined parallax, and captures the real space where the VR system 10 is arranged, and supplies a moving image signal obtained as a result to the information processing apparatus 20. The moving image signal is used for calculation of a distance to a real object existing in the real space, as well as for recognition of the real object.

The microphone 32 collects audio (for example, an utterance of the user, and the like) generated in the real space where the VR system 10 is arranged, and supplies the audio to the information processing apparatus 20.

The projector 33 projects a virtual object to the table, the wall, the floor, the ceiling or the like in the real space on the basis of a video signal that is supplied from the information processing apparatus 20. Additionally, the projector 33 may include an oscillating function such that a virtual object may be projected to an arbitrary position in the real space. It is also possible to arrange a plurality of projectors 33. In the following, an operation of projecting a virtual object by the projector 33 will be referred to also as display of a virtual object.

Additionally, instead of displaying a virtual object in the real space by using the projector 33, the user may be made to visually recognize presence of a virtual object in the real space by using smartglasses or a head-mounted display that is worn by the user.

The speaker 34 outputs, on the basis of an audio signal that is supplied from the information processing apparatus 20, a predetermined sound according to an operation of the user on a virtual object, movement or deformation of the virtual object, or the like. Additionally, a plurality of speakers 34 may be installed or a virtual surround system or an ultra-directional speaker may be used such that the user hears the predetermined audio output by the speaker 34 as if the audio is generated from the virtual object.

<2. Functional Blocks of Information Processing Apparatus 20>

FIG. 2 shows an example configuration of functional blocks of the information processing apparatus 20.

The information processing apparatus 20 includes an image recognition unit 21, a positional relationship detection unit 22, an operation detection unit 23, an audio recognition unit 24, a projection image generation unit 25, and an audio output unit 26.

The image recognition unit 21 recognizes a real object existing in the real space on the basis of a moving image signal that is supplied from the depth camera 31. The positional relationship detection unit 22 detects a virtual positional relationship between an operating tool and a real object in the real space and a virtual object that is projected (for example, a distance or contact/non-contact between real or virtual objects). The operation detection unit 23 detects an operation of the user on the virtual object on the basis of the virtual positional relationship among the operating tool, the real object, and the virtual object.

The audio recognition unit 24 performs an audio recognition process on the audio collected by the microphone 32, and analyzes uttered contents of the user.

The projection image generation unit 25 generates a video signal for displaying a virtual object in the real space. Furthermore, the projection image generation unit 25 serves as a physical property setting unit according to an aspect of the present technology, and sets a physical property in a virtual object to be displayed in the real space. Moreover, the projection image generation unit 25 serves as a virtual object changing unit according to an aspect of the present technology, and adds a physical simulation effect based on the physical property that is set, in response to an operation of the user on the virtual object, to thereby determine the amount of movement or the amount of deformation of the virtual object, and to update the video signal according to the determination result.

The audio output unit 26 serves as a notification unit according to an aspect of the present technology, and generates an audio signal for generating a predetermined sound in response to an operation of the user on a virtual object, movement or deformation of the virtual object, or the like.

Additionally, not all the functional blocks described above have to be housed in a same housing, and some or all of the functional blocks may be arranged in a distributed manner. For example, the image recognition unit 21 may be installed on a predetermined server on the Internet.

<3. Example Arrangement of VR System 10 in Real Space>

Next, FIG. 3 shows an example arrangement of each structural element of the VR system 10 in the real space. However, the example arrangement in the drawing is only an example, and it is also possible to adopt other arrangements.

In the example arrangement in FIG. 3, the depth camera 31 is arranged at a high position on a wall surface such that the entire real space may be captured. The microphone 32 is embedded in the depth camera 31. The projector 33 is arranged at a high position on the wall surface such that a virtual object may be projected to an arbitrary position in the real space. The speaker 34 is arranged on the wall surface.

Furthermore, in the example arrangement in FIG. 3, a cup 61, which is a real object, is placed on a table. Furthermore, a virtual object 51 is displayed on the table. A virtual object 51 in which adhesiveness (described later) is set is attached (displayed) on a wall.

A virtual object 51 may be moved, deformed, or separated in response to an operation of the user.

For example, the virtual object 51 may be used as an operation panel of the control target appliance 41 (display of a TV program guide, various remote control functions), a user interface (UI) for predetermined application programs to be executed by the information processing apparatus 20 (for example, a web browser, a mailer, schedule management, games, photo viewer, a slide show, etc.), a note or the like.

Moreover, the virtual object 51 may be created on the basis of a real object. For example, a handout which is a real object that is placed on the table may be scanned in response to a predetermined operation of the user on the handout (an operation of enclosing the handout with both arms, for example), and the virtual object 51 corresponding to the handout may be created.

Furthermore, for example, a page of a book which is a real object that is placed on the table may be scanned in response to a predetermined operation of the user on the book (for example, an operation of opening the book and folding (dog-earring) a corner of the page, or the like), and the virtual object 51 corresponding to the page may be created.

Furthermore, for example, a magazine or the like which is a real object that is placed on the table or the like may be specified in response to a predetermined operation of the user on the magazine, and electronic book data corresponding to the magazine may be acquired from a predetermined server, and the virtual object 51 that functions as a viewer for the electronic book may be created.

Additionally, illustration of the information processing apparatus 20 is omitted in the example arrangement in FIG. 3, but the information processing apparatus 20 may be installed at an arbitrary position. Alternatively, the information processing apparatus 20 may be integrated with the depth camera 31, the microphone 32, the projector 33, the speaker 34 or the like.

<4. Physical Property of Virtual Object 51>

Next, a description will be given of a physical property that is set in the virtual object 51.

Conventionally, a virtual object that is displayed by a projector or the like is merely projection of light on a table or the like, and no physical properties, such as mass, are added. Accordingly, in the case of moving a virtual object in response to an operation of a user, expression is rendered unnatural, with movement being performed at a same speed regardless of the size or the like of the virtual object, for example.

On the other hand, with the present technology, a change, such as movement or deformation, in the virtual object 51 may be expressed in a similar manner as a change, such as movement or deformation, in an actually existing object, by setting various physical properties in the virtual object 51.

In the following, physical properties that can be set in the virtual object 51 will be described.

Mass

Mass may be set in the virtual object 51. By setting mass in the virtual object 51, an amount of movement or a movement speed may be changed according to the set mass even in a case where a same operation is performed by the user. For example, the heavier the set mass, the more reduced the amount of movement of the virtual object 51 can be, and the lighter the set mass, the more increased the amount of movement of the virtual object 51 can be. Alternatively, the heavier the set mass, the slower the movement of the virtual object 51 can be, and the lighter the set mass, the faster the movement of the virtual object 51 can be.

In the following, the virtual object 51 in which heavy mass is set may be referred to also as a heavy virtual object 51, and the virtual object 51 in which light mass is set may be referred to also as a light virtual object 51.

Additionally, mass of the virtual object 51 may be increased or decreased. For example, in a case where a display function of a mailer is assigned to the virtual object 51, the mass of the virtual object 51 may be changed according to the number of mails held or the capacity.

Furthermore, a difference in mass may be perceived by performing display in such a way that the virtual object 51 slightly bounces or greatly moves according to set mass in a case where the user taps on the table where the virtual object 51 in which the mass is set is displayed.

Moreover, a difference in mass may be perceived by causing, in a case where the user performs a tapping operation on the virtual object 51 in which mass is set, the heavy virtual object 51 to output a low, small sound as if the virtual object 51 is filled inside, and the light virtual object 51 to output a loud, high, reverberating sound due to the inside being empty.

Furthermore, in a case where the user performs a shaking operation on the virtual object 51 in which mass is set, a dry sound may be output as if the inside of the light virtual object 51 is hollow.

Moreover, in a case where the user performs an operation of blowing air on the virtual object 51 in which mass is set, the light virtual object 51 may be displayed in the manner of a flapping sheet of paper, while the heavy virtual object 51 is unmoved.

Center of Gravity

A center of gravity may be set in the virtual object 51. By setting a center of gravity in the virtual object 51, in a case of moving the virtual object 51, the virtual object 51 may be displayed to move while rotating according to a relationship between a position touched by the user and the center of gravity. Additionally, the center of gravity is not limited to a center of the virtual object 51, and may be set at an arbitrary position as long as the position is on the virtual object 51.

In the following, the virtual object 51 in which a center of gravity is set will be referred to also as a virtual object 51 with a center of gravity.

Rigidity

Rigidity may be set in the virtual object 51. By setting rigidity in the virtual object 51, expression may be performed in such a way that, in a case where a same operation is performed by the user, a hard virtual object 51 is not deformed but a soft virtual object 51 is deformed. Furthermore, for example, expression such as wrinkles, distortion, bending, rolling up and the like may be performed for a virtual object 51 in which rigidity is set. Additionally, setting of rigidity is not limited to hard or soft, and rigidity may also be set stepwise according to levels of hardness or softness.

In the following, the virtual object 51 in which high rigidity is set will be referred to also as a hard virtual object 51, and the virtual object 51 in which low rigidity is set will be referred to also as a soft virtual object 51.

Figure 4B:
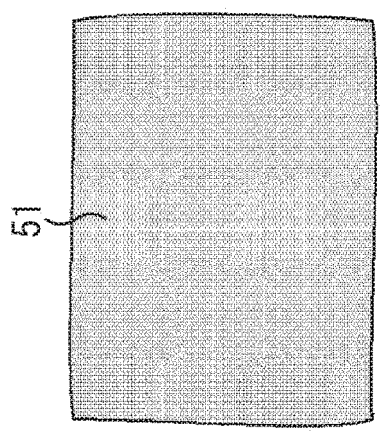
FIGS. 4A and 4B are diagrams showing an example display of a virtual object in which rigidity is set.
Figure 4A:
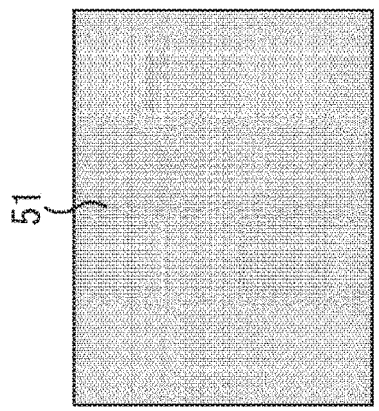

FIGS. 4A and 4B show an example display of the virtual object 51 in which rigidity is set. As shown in A of the drawing, a hard virtual object 51 may be expressed by making all the contour lines straight lines. Furthermore, as shown in B of the drawing, a soft virtual object 51 may be expressed by using freehand curved lines as the contour lines.

Figure 5:
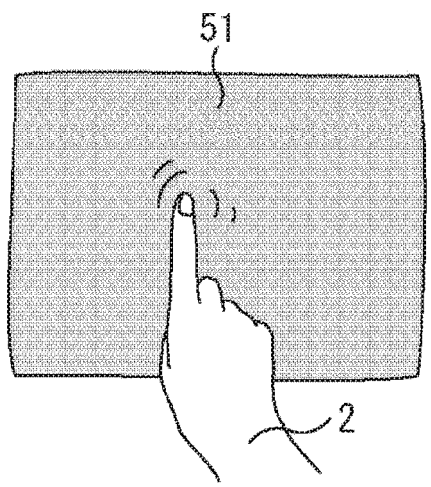
FIG. 5 is a diagram showing an example display of a virtual object in which rigidity is set.

FIG. 5 shows an example display for a case where a virtual object 51 in which rigidity is set is operated by a user. The virtual object 51 in which rigidity is set may be expressed by causing wrinkles and distortion in response to an operation of the user. At this time, the wrinkles and distortion may be reduced for a hard virtual object 51, and the wrinkles and distortion may be increased for a soft virtual object 51.

Furthermore, in a case where the user performs a tapping operation on the virtual object 51 in which rigidity is set, the hard virtual object 51 may be caused to emit sound, and the soft virtual object 51 may be caused to not emit sound.

As described above, by distinguishing between movement or sound of the hard virtual object 51 and the soft virtual object 51, the user may intuitively grasp that rigidity is set in the virtual object 51.

Magnetism

Magnetism may be set in the virtual object 51. Furthermore, setting may be performed while distinguishing between polarities (N polarity and S polarity) of magnetism.

By setting magnetism in the virtual object 51, the virtual object 51 may be expressed to be attached to an iron real object such as a refrigerator, for example. In contrast, expression may also be performed such that the virtual object 51 in which magnetism is not set falls off when attached to an iron real object such as a refrigerator, for example. Moreover, expression may be performed in such a way that the virtual objects 51 in which magnetism is set are coupled with each other.

In the following, the virtual object 51 in which magnetism is set will be referred to also as a magnetic virtual object 51.

Figure 6:
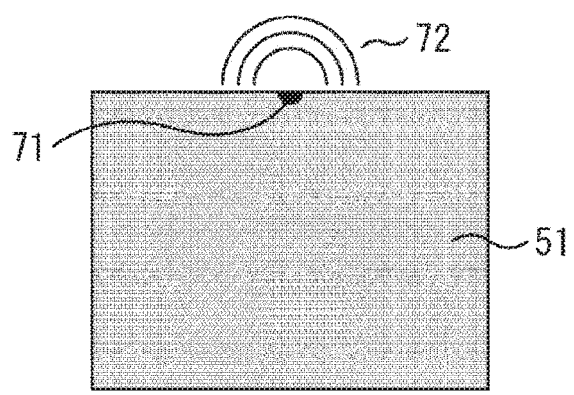
FIG. 6 is a diagram showing an example display of a virtual object in which magnetism is set.

FIG. 6 shows an example display of the magnetic virtual object 51. A magnet 71 and a magnetic line 72 generated from the magnet 71 may be displayed with the magnetic virtual object 51. Additionally, the magnet 71 and the magnetic line 72 may be displayed at all times, or may be displayed only during a period when the user is performing an operation on the virtual object 51.

Furthermore, with respect to display of the magnetic line 72, a waveform may be caused to move by animation. Moreover, a direction of such movement or an arrow may be displayed to indicate the set magnetism, or in other words, the polarity (N polarity or S polarity) of the magnet 71.

By expressing the movement of the virtual object 51 in which magnetism is set in the above manner, the user is enabled to intuitively grasp that magnetism is set in the virtual object 51.

Adhesiveness

Adhesiveness may be set in the virtual object 51. By setting adhesiveness in the virtual object 51, expression may be performed in such a way that the virtual object 51 is attached to a wall or a ceiling in the manner of a sticky note, for example.

In the following, the virtual object 51 in which adhesiveness is set will be referred to also as an adhesive virtual object 51.

Figure 7:
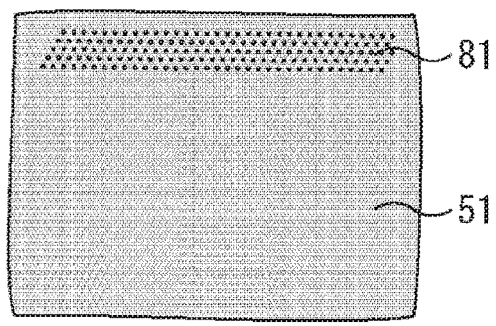
FIG. 7 is a diagram showing an example display of a virtual display in which adhesiveness is set.

FIG. 7 shows an example display of the adhesive virtual display 51. With the adhesive virtual object 51, glue 81 indicating that adhesiveness is present may be displayed on a back-side surface. Additionally, the glue 81 may be displayed on the entire virtual object 51 or a part thereof. Furthermore, the glue 81 may be displayed at all times, or may be displayed only during a period when the user is performing an operation on the virtual object 51.

By expressing the movement of the virtual object 51 in which adhesiveness is set in the above manner, the user is enabled to intuitively grasp that adhesiveness is set in the virtual object 51.

Coefficient of Friction

A coefficient of friction may be set in the virtual object 51. By setting a small value in the virtual object 51 as the coefficient of friction, sliding of the virtual object 51 may be expressed in a case of moving the virtual object 51 on the table, for example. In contrast, by setting a great value in the virtual object 51 as the coefficient of friction, application of braking may be expressed in a case of moving the virtual object 51 on the table, for example.

Furthermore, a surface of the virtual object 51 in which a small value is set as the coefficient of friction is smooth, and thus, expression may be performed in such a way that ink is shed even when letters are written on the surface of the virtual object 51.

In the following, the virtual object 51 in which a small value is set as the coefficient of friction will be referred to also as a smooth virtual object 51.

Figure 8:
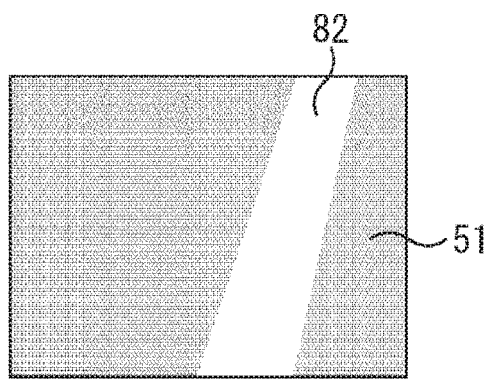
FIG. 8 is a diagram showing an example display of a virtual object in which smoothness is set.

FIG. 8 shows an example display of the smooth virtual object 51. Luster 82 indicating smoothness may be displayed on a surface of the smooth virtual object 51. Additionally, a display position of the luster 82 may be changed in response to movement of the head of the user, or in other words, an angle at which the user looks at the virtual object 51.

By expressing the smooth virtual object 51 in the above manner, the user is enabled to intuitively grasp that a coefficient of friction that takes a small value is set in the virtual object 51.

Fragility

Fragility may be set in the virtual object 51. By setting fragility in the virtual object 51, the virtual object 51 may be split into two or more by the user performing a gesture operation of chopping and dividing the virtual object 51, and one or more copies of the original virtual object 51 may thereby be created, for example. Furthermore, to indicate fragility, the virtual object 51 may be displayed with a part thereof chipped.

In the following, the virtual object 51 in which fragility is set may be referred to also as a fragile virtual object 51.

By expressing the virtual object 51 in which fragility is set in the above manner, the user is enabled to intuitively grasp that fragility is set in the virtual object 51.

Heat Resistance (State Transformation)

Heat resistance may be set in the virtual object 51. By setting low heat resistance in the virtual object 51, a shape may be caused to change by melting, for example, in a case where a temperature is high.

By expressing the virtual object 51 in which heat resistance is set in the above manner, the user is enabled to intuitively grasp that heat resistance is set in the virtual object 51.

Solubility (Chemical Change)

Solubility may be set in the virtual object 51. By setting solubility in the virtual object 51, the virtual object 51 may be caused to be dissolved in liquid in response to the virtual object 51 being brought close to the liquid. Furthermore, in response to an operation of bringing the virtual objects 51 in which solubility is set close to each other, the two may become mixed or a new virtual object may be created as if by chemical change. For example, two notes (two virtual objects 51) may be integrated into one note (one virtual object) in response to an operation of bringing the virtual objects 51 functioning as notes close to each other. Furthermore, for example, contents of a note may be registered as a schedule in response to an operation of bringing the virtual object 51 functioning as a note, in which solubility is set, close to a calendar which is a real object.

By expressing movement of the virtual object 51 in which solubility is set in the above manner, the user is enabled to intuitively grasp that solubility is set in the virtual object 51.

Additionally, the physical properties described above may be set in combination as appropriate. Furthermore, with respect to the physical properties described above, in addition to allowing setting of presence/absence, the levels may also be adjusted by the user at an arbitrary timing.

Furthermore, the level may be automatically changed instead of the level being adjusted by the user. For example, the level of smoothness set in the virtual object 51 that is frequently moved may be changed so as to facilitate movement of the virtual object 51.

<5. Movement of Virtual Object 51 in Response to Operation of User>

Next, a description will be given of movement of the virtual object 51 in response to an operation of the user.

An operation may be intuitively performed on the virtual object 51 in the same manner as an operation on a real object, by the user directly performing operation by an instructing part 2 such as a fingertip. Furthermore, an operation may be intuitively performed on the virtual object 51 in the same manner as an operation on a real object, by the user indirectly operating the virtual object 51 as a target of an operation by moving a real object such as the cup 61 or another virtual object 51.

Figure 9B:
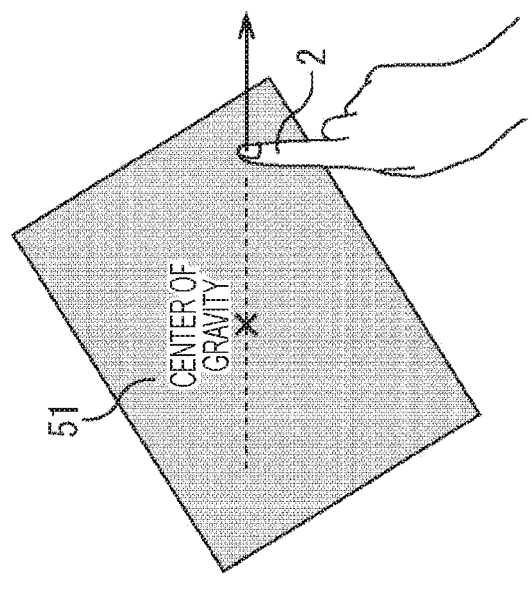
FIGS. 9A and 9B are diagrams showing an example display for when a virtual object in which a center of gravity is set is moved by dragging.
Figure 9A:
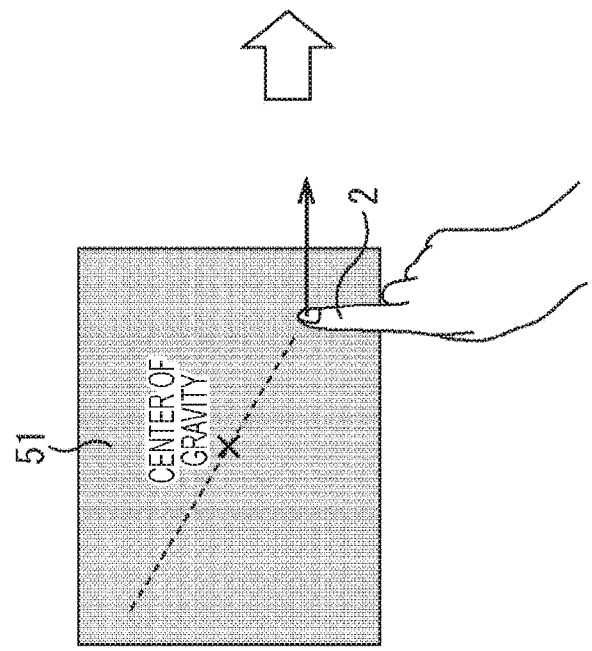

FIGS. 9A and 9B show an example display for a case where a dragging operation is performed by the user on the virtual object 51 with a center of gravity.

As shown in A of the drawing, a center of gravity is set at a center of the virtual object 51. It is assumed that the user performs an operation of touching, and pulling (dragging) in a right direction, a position that is to a lower right of the center of gravity of the virtual object 51 by the instructing part 2. In this case, as shown in B of the drawing, the virtual object 51 is moved in the right direction while being rotated until a straight line connecting the center of gravity and the instructing part 2 becomes parallel to a movement direction.

Figure 10B:
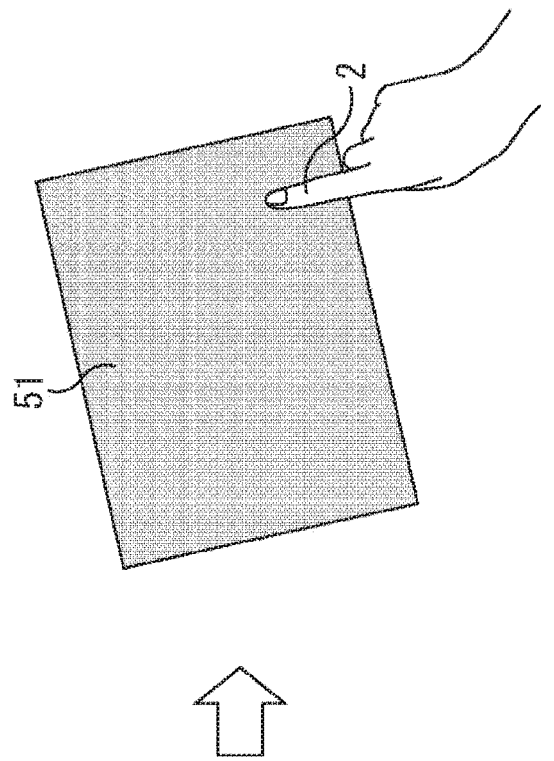
FIGS. 10A and 10B are diagrams showing an example display for when a twisting operation is performed on a hard virtual object.
Figure 10A:
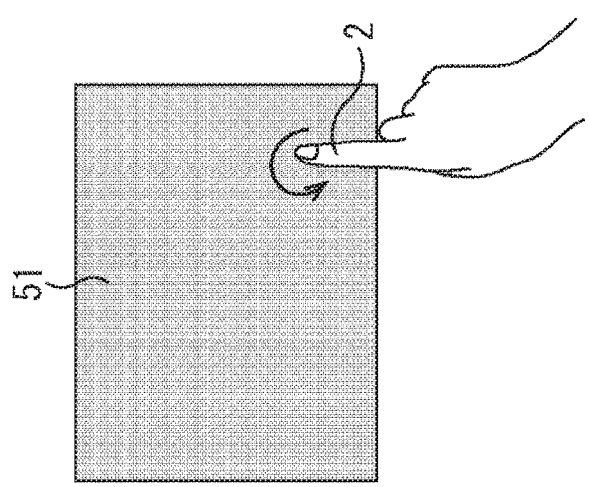

FIGS. 10A and 10B show an example display for a case where the user performs a twisting operation on the hard virtual object 51.

As shown in FIG. 10A of the drawing, it is assumed that the user performs an operation of touching, and twisting counterclockwise, the virtual object 51 with the instructing part 2. In this case, in the case of the hard virtual object 51, the virtual object 51 is rotated counterclockwise around the instructing part 2, as shown in FIG. 10B.

Figure 11:
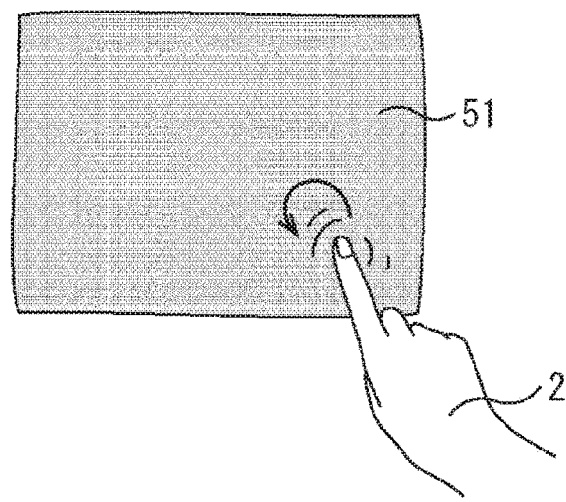
FIG. 11 is a diagram showing an example display for when a twisting operation is performed on a soft virtual object.

FIG. 11 shows an example display for a case where the user performs a twisting operation on the soft virtual object 51.

In the case of the soft virtual object 51, wrinkles may be displayed around the instructing part 2 without the virtual object 51 being rotated.

Figure 12:
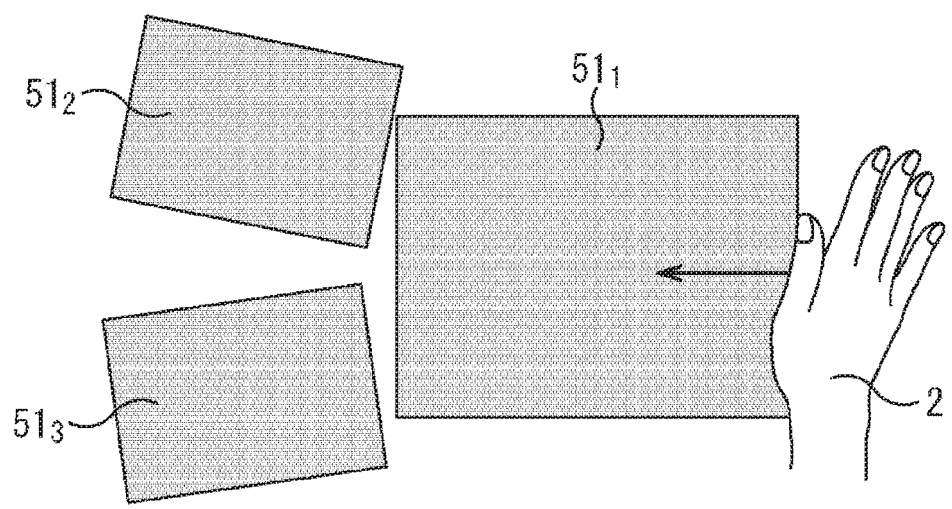
FIG. 12 is a diagram showing an example display for a case where a plurality of virtual objects is moved in coordination.

FIG. 12 shows an example display for a case where a plurality of virtual objects 51 is moved in coordination in response to an operation performed by the user of pushing a hard virtual object 51.

As shown in the drawing, if the user performs an operation of pushing a virtual object $51_1$ in a left direction from a right side, the virtual object $51_1$ is moved in the left direction. At this time, virtual objects $51_2$ and $51_3$ displayed on a left side of the virtual object $51_1$ are also moved in the left direction in coordination. A plurality of virtual objects 51 may be moved in coordination also in a case of performing a dragging operation, in addition to the operation of pushing the virtual object 51.

Figure 13A:
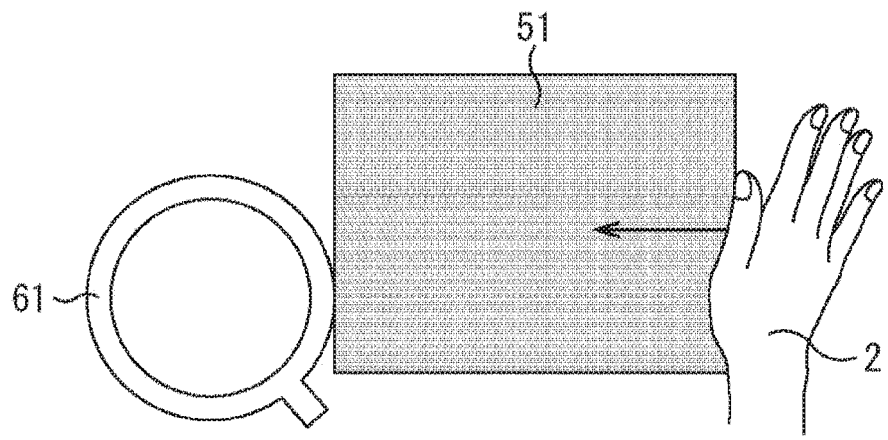
FIGS. 13A and 13B are diagrams showing an example display for a case where a virtual object contacts a real object.
Figure 13B:
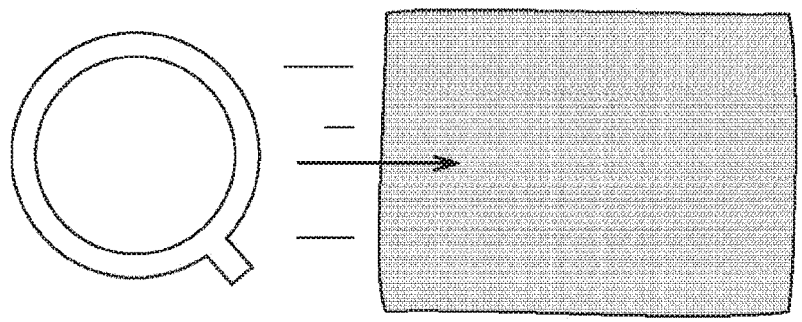

FIGS. 13A and 13B show an example display for a case where the user performs an operation of pushing the hard virtual object 51, thereby causing the virtual object 51 to contact the cup 61, which is a real object.

As shown in A of the drawing, in a case where the user performs an operation of pushing the hard virtual object 51 in the left direction from the right side to move the virtual object 51 in the left direction, and the virtual object 51 contacts the cup 61, expression may be performed in such a way that the virtual object 51 does not move further to the left side. In this case, if the user continues the operation of pushing in the left direction, the operation will be performed in vain.

Additionally, in a case where the virtual object 51 contacts the cup 61 at a high speed, expression may be performed as shown in B of the drawing in such a way that the virtual object 51 bounces back from the cup 61.

Figure 14:
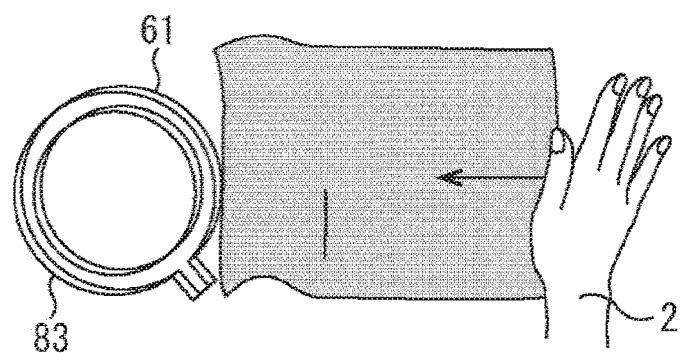
FIG. 14 is a diagram showing an example display for a case where a virtual object contacts a real object.

FIG. 14 shows an example display for a case where the soft virtual object 51 contacts the cup 61, which is a real object.

As shown in the drawing, in a case where the user performs an operation of pushing the soft virtual object 51 in the left direction from the right side to move the virtual object 51 in the left direction, and the virtual object 51 contacts the cup 61, folding of the soft virtual object 51 may be expressed.

Furthermore, with respect to the cup 61 contacted by the virtual object 51, by performing projection mapping of slighting moving, in a manner of an afterimage, a virtual object 83 having a same shape as the cup 61 generated by scanning the cup 61, a visual effect as if the cup 61 is moved may be created.

Figure 15:
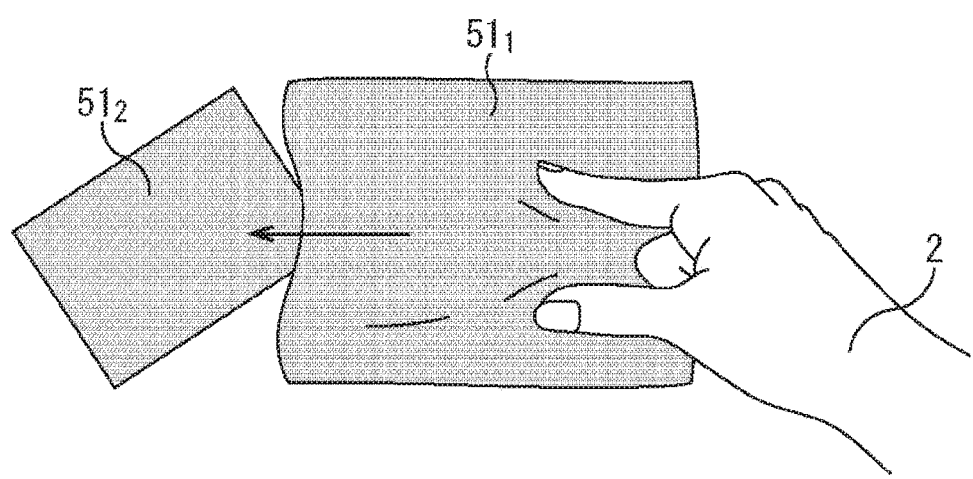
FIG. 15 is a diagram showing an example display for a case where an operation of pinching and moving a soft virtual object is performed.

FIG. 15 shows an example display for a case where the user performs a pinching operation on the soft virtual object 51.

As shown in the drawing, if the user performs a pinching operation on a soft virtual object $51_1$, the virtual object $51_1$ in a planar form is creased, and a part of the virtual object $51_1$ (the left side in the drawing) is raised. If the virtual object $51_1$ is moved in such a state in the left direction to another virtual object $51_2$, expression may be performed in such a way that the virtual object $51_1$ is overlapped on the virtual object $51_2$. Furthermore, for example, expression may be performed in such a way that the virtual object $51_1$ is overlapped on a relatively thin real object such as a sheet of paper.

Figure 16:
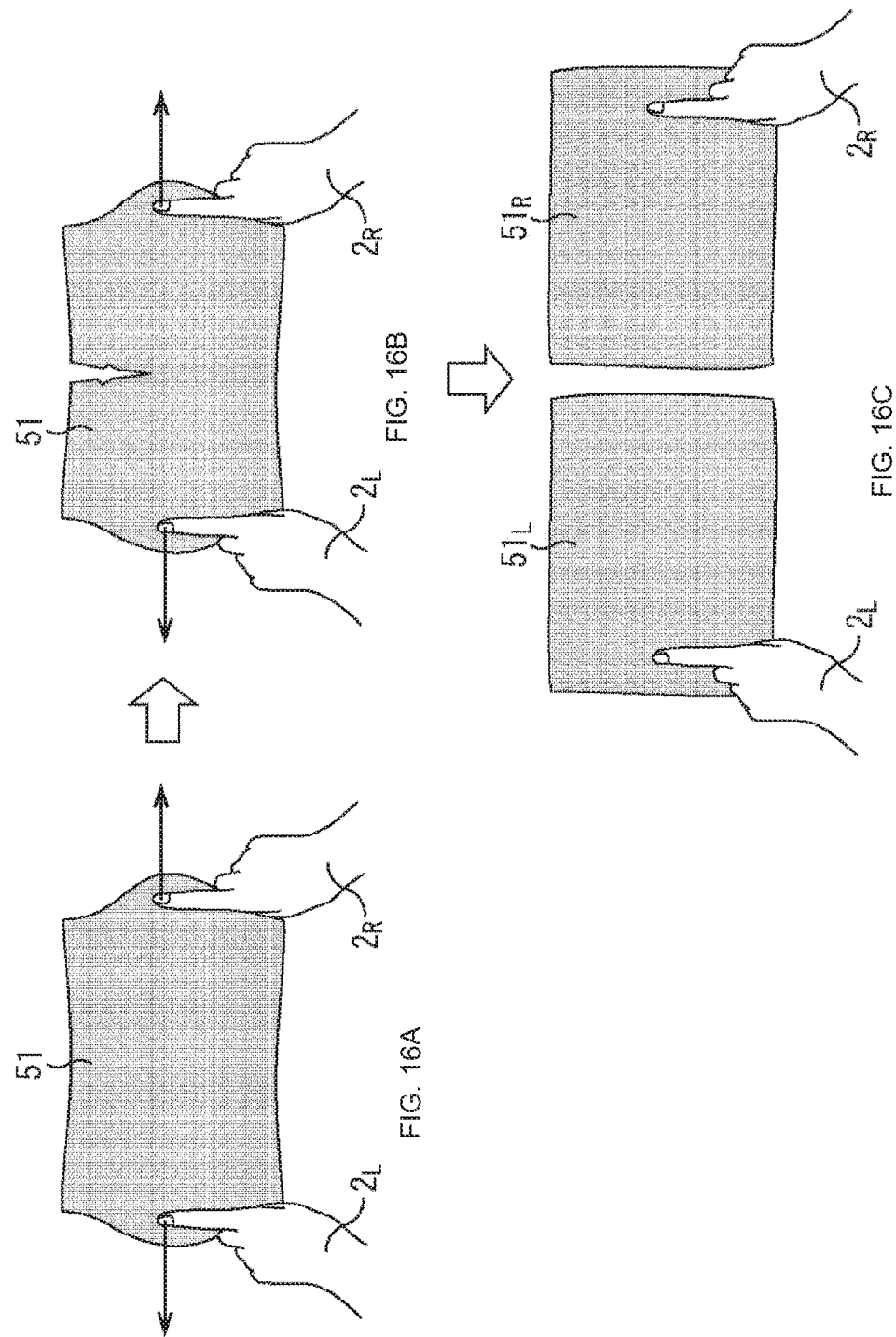
FIGS. 16A, 16B, and 16C are diagrams showing an example display for a case where an operation of tugging a soft virtual object left and right is performed.

FIGS. 16A, 16B, and 16C show an example display for a case where the user performs a tugging operation on the soft virtual object 51.

As shown in A of the drawing, if the user performs an operation of tugging the virtual object 51 left and right, the virtual object 51 is tugged and stretched. Then, if the user stops the operation of tugging the virtual object 51 left and right, the virtual object 51 returns to the original shape. On the other hand, if the user further performs the operation of tugging the virtual object 51, as shown in B of the drawing, the virtual object 51 is torn and is split into a virtual object $51_L$ and a virtual object $51_R$. Additionally, the two split virtual objects $51_L$, $51_R$ may be half the size of the original virtual object 51 in the torn state, or the virtual objects $51_L$, $51_R$ may each have the same size and contents as the virtual object 51 before splitting, as shown in C of the drawing. In this case, that a copy of the original virtual object 51 is created may be expressed.

Figure 17:
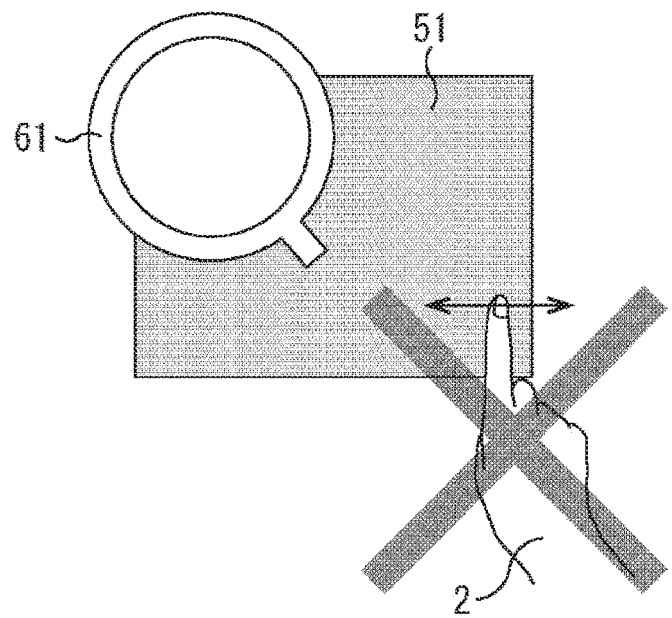
FIG. 17 is a diagram showing an example display for a case where a heavy real object is placed on top of a virtual object.

FIG. 17 shows an example display for a case where the cup 61, which is a relatively heavy real object, is placed on the virtual object 51 that is displayed in advance.

In this case, expression may be performed in such a way that the virtual object 51 cannot be moved even if the user performs a tugging operation or the like to move the virtual object 51. However, in a case where the cup 61 is light, movement of the virtual object 51 may be allowed. A weight of the cup 61 may be estimated on the basis of a result of image recognition, or may be registered in advance.

Furthermore, in a case where the cup 61 is placed on one end of the soft virtual object 51, and the user performs an operation of dragging the other end of the virtual object 51, the virtual object 51 may be stretched or split in the manner described above with reference to FIGS. 16A, 16B, and 16C.

Figure 18:
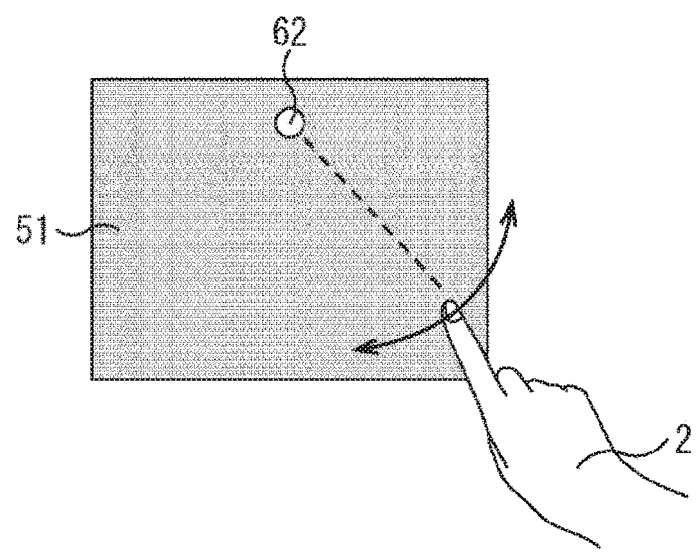
FIG. 18 is a diagram showing an example display for a case where a light real object is placed on top of a virtual object.

FIG. 18 shows an example display for a case where a pin 62, which is a relatively light real object, is placed on top of the virtual object 51 that is displayed in advance.

In such a case, if the user performs an operation to move the virtual object 51, expression may be performed in such a manner that the virtual object 51 is rotated around the pin 62.

Next, movement of the virtual object 51 in response to an operation of the user performed using a real object will be described.

An operation similar to an operation on a real object may be intuitively performed also in a case where the user indirectly operates the virtual object 51 using a real object.

Figure 19:
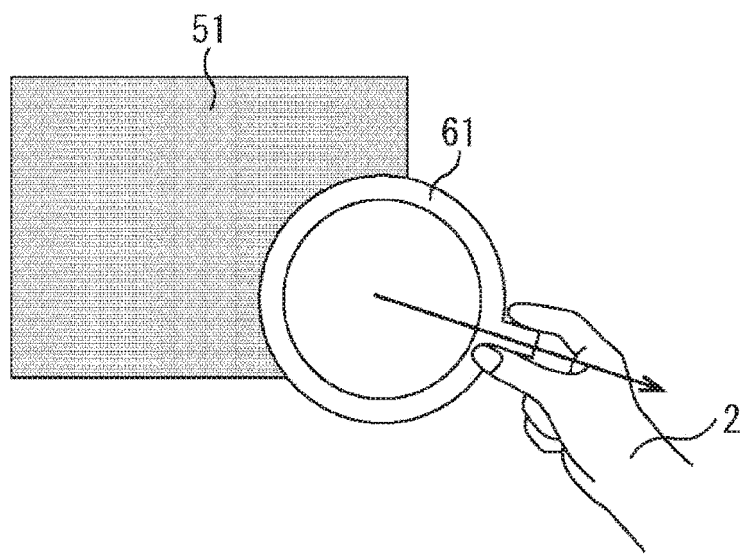
FIG. 19 is a diagram showing an example display for a case where a virtual object is moved by indirectly performing an operation of dragging by using a real object.

FIG. 19 shows an example display for a case where the user moves the virtual object 51 by performing an operation of dragging the virtual object 51 using a real object.

In the following description, the cup 61 is cited as an example of the real object used to indirectly operate the virtual object 51, but the real object to be used to indirectly operate the virtual object 51 is not limited to the cup 61, and any real object may be used.

As shown in the drawing, the user may move the virtual object 51 by placing the cup 61, which is a real object, on top of the virtual object 51, and performing an operation of dragging the cup 61.

Figure 20:
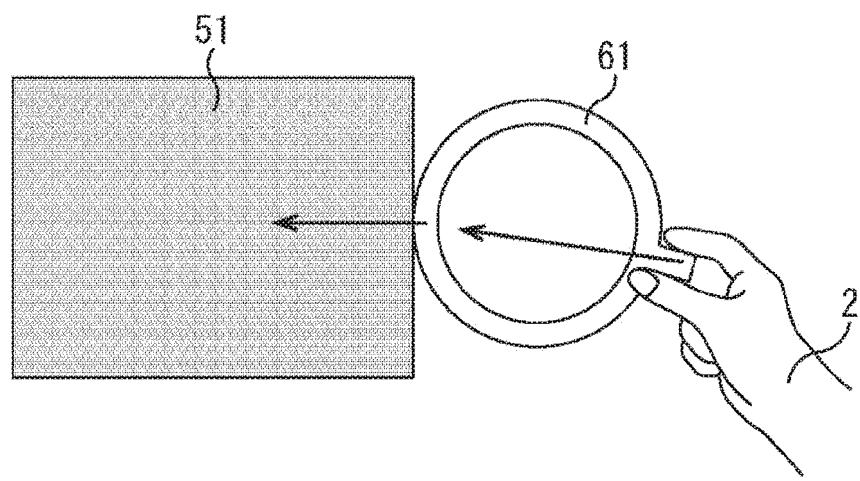
FIG. 20 is a diagram showing an example display for a case where a virtual object is moved by indirectly performing an operation of pushing by using a real object.

FIG. 20 shows an example display for a case where the user moves the virtual object 51 by performing an operation of pushing the virtual object 51 using a real object.

As shown in the drawing, the user may move the virtual object 51 by performing an operation of pushing the virtual object 51 by the cup 61, which is a real object. Additionally, the virtual object 51 may be caused to bounce away in a case where an operation of hitting the virtual object 51 with the cup 61 at or greater than a predetermined speed is performed.

<6. Operation on Virtual Object 51 in which Magnetism is Set>

As described above, magnetism may be set in the virtual object 51. By setting magnetism in the virtual object 51, expression may be performed in such a way that the virtual object 51 is attached to an iron real object such as a refrigerator, for example. Furthermore, magnetism may be set in a real object, such as a wall or a ceiling, which is not made of iron and which actually does not allow a magnet to stick. In such a case, the virtual object 51 in which magnetism is set may be attached to a wall or the like in which magnetism is set.

Figure 21:
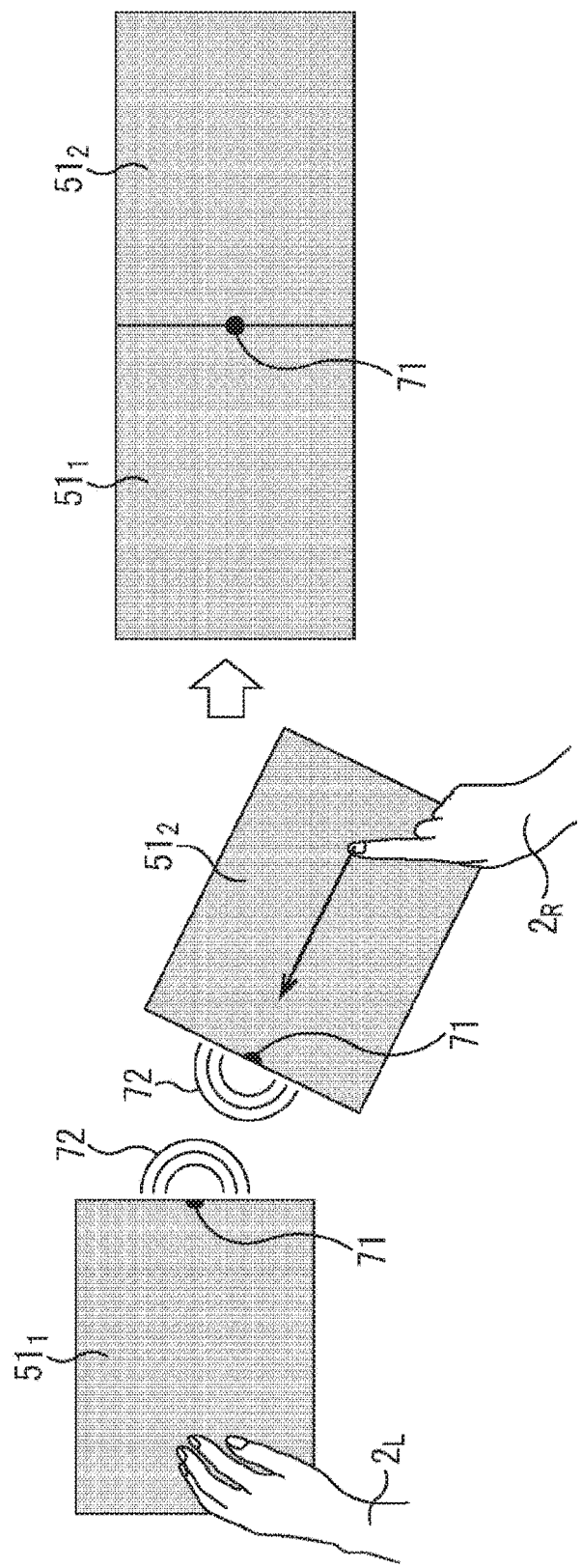
FIGS. 21A and 21B are diagrams showing an example display for a case where virtual objects in which magnetism is set are brought close to each other.

FIGS. 21A and 21B show an example display for a case where the magnetic virtual objects 51 are brought close to each other.

As shown in A of the drawing, in a case where a magnetic virtual object $51_1$ and a magnetic virtual object $51_2$ are brought close to each other, if polarities of the magnetism of the virtual object $51_1$ and the virtual object $51_2$ are different, the virtual object $51_1$ and the virtual object $51_2$ are coupled with each other as shown in B of the drawing. In this case, if an operation is performed to move one of the virtual object $51_1$ or the virtual object $51_2$, the other is also moved in a coupled state. Additionally, coupling may be released by performing an operation on each of the coupled virtual object $51_1$ and virtual object $51_2$ to separate the two.

Additionally, in a case where polarities of the magnetism of the virtual object $51_1$ and the virtual object $51_2$ that are brought close to each other are the same, expression may be performed in such a way that the virtual object $51_1$ and the virtual object $51_2$ are separated by repulsion.

Figure 22:
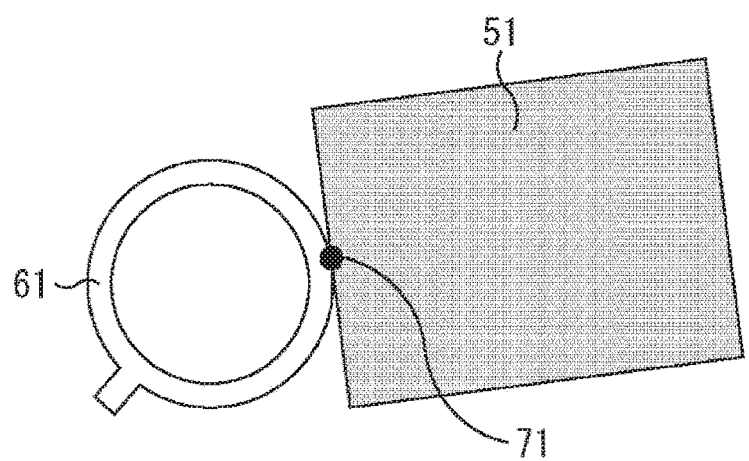
FIG. 22 is a diagram showing an example display for a case where a real object in which magnetism is set and a virtual object in which magnetism is set are brought close to each other.

FIG. 22 shows an example display for a case where the cup 61 which is a real object and in which magnetism is set and the magnetic virtual object 51 are brought close to each other.

If polarities of the magnetism of the cup 61 and the virtual object 51 are different, the cup 61 and the virtual object 51 are coupled with each other as shown in the drawing. In this case, if an operation is performed to move one of the cup 61 or the virtual object 51, the other is also moved in a coupled state. For example, in a case where the cup 61 is lifted from the table and is put down on another place, the coupled virtual object 51 is moved together with the cup 61, and is displayed at a movement destination. Additionally, coupling may be released by performing an operation on each of the coupled cup 61 and virtual object 51 to separate the two.

<7. Other Operations on Virtual Object 51>

Gesture Operation

Figure 23:
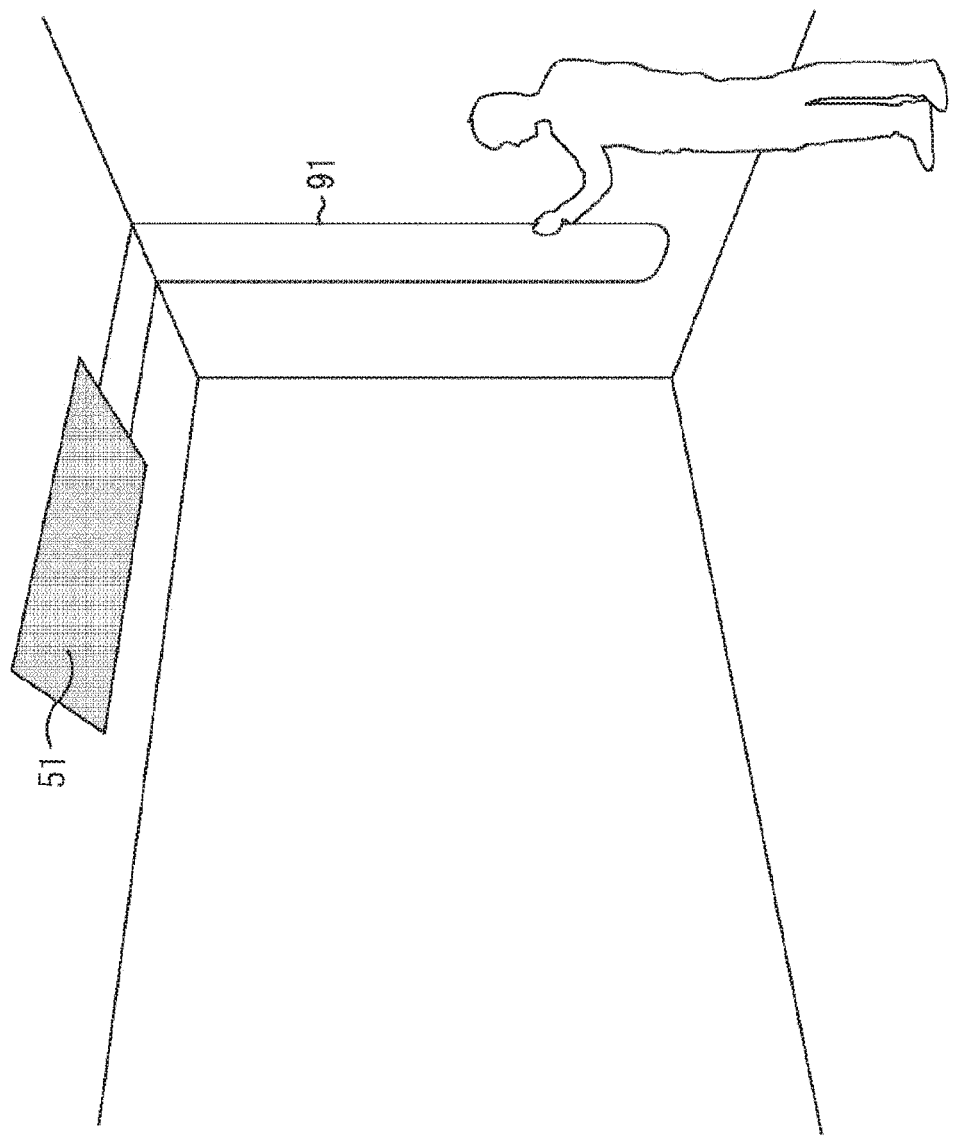
FIG. 23 is a diagram describing an example of a user moving a virtual object by a gesture operation.

FIG. 23 shows an example of a gesture operation of the user on the virtual object 51.

As shown in the drawing, it is assumed that the virtual object 51 is attached on the ceiling, and a cord 91, which is a virtual object, is hanging from the virtual object 51 along the wall. The user may adjust a position of the virtual object 51 by performing an operation of pulling the cord 91. Additionally, the cord 91 may be displayed at all times, or may be displayed only when the user is looking at the virtual object 51 on the ceiling while standing near the wall.

Operation Using Shadow

Figure 24:
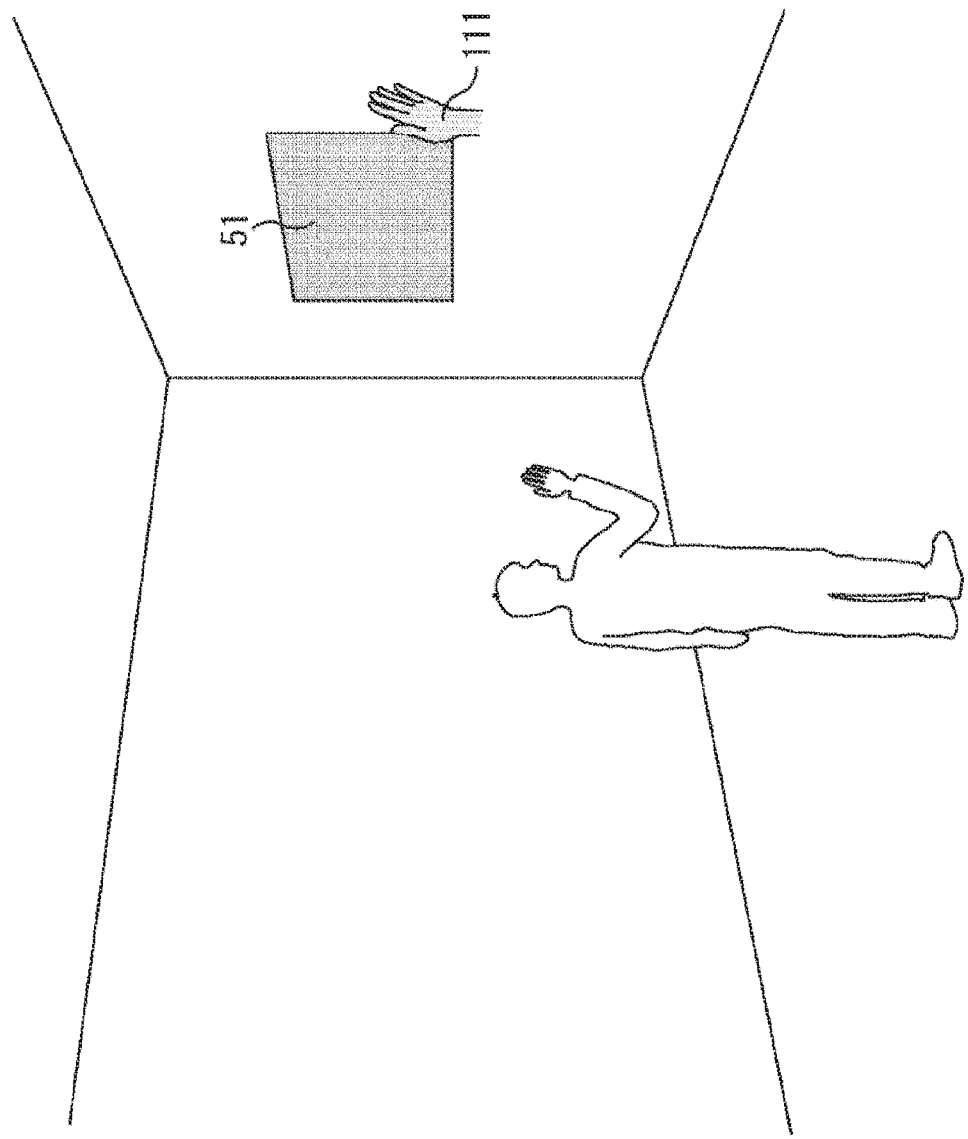
FIG. 24 is a diagram describing an example of a user moving a virtual object by his/her shadow.

FIG. 24 shows an example of operation that is performed on the virtual object 51 using a shadow of the user. Additionally, in the drawing, only the part of the hand is shown as the shadow of the user, and shadows of other than the hand are omitted.

As shown in the drawing, the virtual object 51 that is attached on the wall may be moved by the user casting a shadow 111 of his/her instructing part (for example, a hand) beside the virtual object 51 and performing an operation of pushing the virtual object 51 by the shadow 111. Additionally, the shadow 111 for operating the virtual object 51 is not limited to that of the hand, and operation of the virtual object 51 by the shadow of a head may also be enabled, for example.

Operation of Grasping Virtual Object 51

The user is enabled to perform a grasping operation on the soft virtual object 51. Specifically, the user may hold the virtual object 51 in a hand, as the instructing part 2, by performing an operation of opening and placing the hand on the virtual object 51 and grasping the hand.

In this case, when the virtual object 51 is held in the hand, display of the virtual object 51 may be erased, and the hand of the user may be lit (light may be projected) to indicate that the virtual object 51 is being held in the hand, for example.

Furthermore, the erased virtual object 51 may be displayed again in response to an operation of the user of opening the hand grasping the virtual object 51. Moreover, the virtual object 51 may be attached (displayed) on a wall or the like in response to a gesture operation of the user of throwing the virtual object 51 at the wall or the like while grasping the virtual object 51.

Operation of Rolling Up Virtual Object 51

The user may perform an operation of rolling up the soft virtual object 51 like a handscroll. Furthermore, the rolled-up virtual object 51 may be displayed again in an open state by the user performing an operation opposite the operation at the time of rolling up.

Operation of Folding Virtual Object 51

The user may perform a folding operation on the soft virtual object 51. Furthermore, the folded virtual object 51 may be displayed again in an open state by the user performing an operation opposite the operation at the time of folding.

Operation of Tearing Virtual Object 51

The user may perform a tearing operation on the soft virtual object 51. Specifically, expression may be performed in such a way that a part of the virtual object 51 is torn off in response to the user performing an operation of holding the virtual object 51 with one hand and tugging, with the other hand, apart of the virtual object 51 that is not being held. Moreover, the entire virtual object 51 may be restored from the part of the virtual object 51 that is torn off, or in other words, a copy of the virtual object 51 may be created.

Operation of Scraping Virtual Object 51

The user may perform a scraping operation on the soft virtual object 51. Specifically, for example, a virtual object 51 which is a scratch card is assumed, and a surface of the virtual object 51 may be scraped and some kind of information may be displayed at a scraped position of the virtual object 51, in response to the user performing an operation of scraping the virtual object 51 with a nail, a coin or the like.

Operation of Wiping Virtual Object 51

The user may perform a wiping operation on the virtual object 51. Specifically, for example, a virtual object 51 with a clouded surface is assumed, and some kind of information may be displayed on the virtual object 51 by the user performing an operation of wiping the virtual object 51 with a hand or the like to clear the cloudiness.

Operation of Dropping Virtual Object 51

By the user performing an operation of moving the virtual object 51 to an edge of the table or the like and pushing or dragging the virtual object 51 in the manner described above, the virtual object 51 may be displayed to fall off the table or the like to the floor or the like. Moreover, display of the virtual object 51 which fell from the table of the like may be erased, or the virtual object 51 may be displayed on the floor or the like. Additionally, in a case where the virtual object 51 that is dropped from the table or the like is used as an UI of an application program, the application program may be ended. That is, the user may end an application program by dropping the corresponding virtual object 51 from the table or the like.

Operation of Stacking Virtual Objects 51

The user may perform a stacking operation on a plurality of virtual objects 51. Specifically, a plurality of virtual objects 51 that is displayed on the table of the like may be displayed in a stacked manner in response to the user performing an operation of gathering the plurality of virtual objects 51 with both hands.

Furthermore, for example, the plurality of stacked virtual objects 51 may be displayed again in a spread manner by the user performing, on the plurality of virtual objects 51, a gesture operation in a manner of spreading stacked cards or the like. Furthermore, the plurality of virtual objects 51 may be displayed to fall and spread on the table by the user performing an operation of holding up, and then releasing, the plurality of stacked virtual objects 51.

Additionally, in a case where a plurality of virtual objects 51 with similar functions is displayed (for example, in a case where each of the virtual objects 51 is displaying a photograph as a photo viewer), the plurality of virtual objects 51 may be automatically grouped (by being stacked or integrated, for example) without an operation of the user.

Operation of Turning Over Virtual Object 51

The user may perform an operation of turning over the virtual object 51. Specifically, for example, a virtual object 51 including a plurality of pages, such as a magazine, is assumed, and the page of the virtual object 51 may be turned and display contents may be changed in response to the user performing an operation of turning over the virtual object 51 using a thumb or the like. Moreover, a page of the virtual object 51 may be moved and displayed in response to an operation of turning and dragging the page.

Operation of Turning Virtual Object 51

The user may perform a turning operation on the virtual object 51. Specifically, for example, a dial-type virtual object 51 is assumed, and a predetermined parameter (for example, a volume of audio that is currently output) may be changed in response to the user performing a turning operation on the virtual object 51.

Operation of Causing Virtual Object 51 to Stand Upright

The user may perform an operation of causing the virtual object 51 to stand upright. Specifically, for example, a virtual object 51 with a certain thickness is assumed, and the virtual object 51 may be displayed in an upright manner in response to the user performing an operation of turning, 90 degrees, the virtual object 51.

<8. Prevention of Erroneous Display of Virtual Object 51>

As a method of preventing erroneous display of the virtual object 51, changing display of the virtual object 51 by movement, deformation or the like may be prohibited in a case where the user is not directly or indirectly performing an operation.

Furthermore, as a method of preventing erroneous display of the virtual object 51, a line-of-sight direction of the user may be detected, and a change in display of the virtual object 51 that is in a direction not viewed by the user may be prohibited.

Moreover, as a method of preventing erroneous display of the virtual object 51, an unintentional operation of the user (for example, unintentional bumping into the virtual object 51) may be ignored.

Still further, as a method of preventing erroneous display of the virtual object 51, a region where the display of the virtual object 51 is not to change may be set in advance.

<9. Improvement in Operability of User>

To improve operability of the user, a visual feedback such as display of light around the virtual object 51 as an operation target may be performed before display of the virtual object 51 is changed in response to an operation of the user.

Such a visual feedback does not have to be displayed in a case where the user is used to using the VR system 10 (for example, in a case where a use period exceeds a threshold).

After display of the virtual object 51 is changed, the changed display of the virtual object 51 may be returned to original display in response to the user performing a predetermined cancel operation (for example, utterance of "cancel" or a swift wave of a hand).

A tutorial may be automatically displayed at an initial stage when the user starts using the VR system 10.

For example, age or the like of the user may be taken into account, and a display size may be increased to facilitate operation of the virtual object 51 in a case where the user is a child or an elderly person, for example.

The virtual object 61 may be displayed in response to appearance of a real object that is associated in advance. For example, in a case where the virtual object 51 that functions as an UI of an application program for schedule management is associated in advance with a pocket book which is a real object, the virtual object 51 that functions as the UI of the application program for schedule management may be displayed on the table in response to placement of the pocketbook on the table.

<10. Expected Use Cases>

Next, expected use cases of the VR system 10 will be described.

For example, the user who is relaxing with the cup 61, which is a real object, in a hand thinks about watching a movie, and utters "display a movie list on a table". The utterance is speech-recognized and is detected as an uttered operation, and the virtual object 51 that functions as an UI for a movie list (hereinafter such a virtual object 51 will be referred to simply as "movie list") is displayed on the table in response to the uttered operation.

At this time, the movie list is displayed at a position and with a size that do not overlap the real object on the table. In a case where contour lines of the displayed movie list are gently curved lines, the user may grasp that the movie list is the soft virtual object 51.

Next, the user tries to return the cup 61 held in the hand to the table. At this time, because the movie list is displayed on the table, the cup 61 becomes an obstacle when placed on top of the movie list. Here, if the user performs an operation of pushing the movie list using the cup 61, the movie list may be easily moved.

Figure 25:
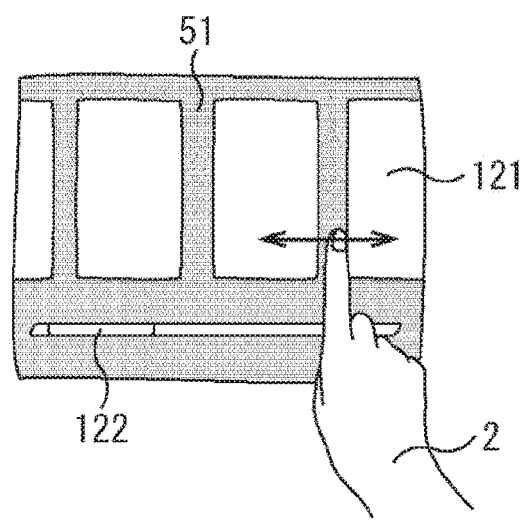
FIG. 25 is a diagram showing an example display of a virtual object functioning as an UI for a list of movies.

FIG. 25 shows an example display of the virtual object 51 functioning as a movie list. A scroll region 121 where introductions (including photographs and the like) of various movies (contents) are displayed in a scroll is provided in the virtual object 51. A scroll bar 122 for scrolling the display in the scroll region 121 is also provided in the virtual object 51.

If the user who is searching for a movie that the user wants to watch performs a scroll operation of moving the instructing part 2 left and right on the scroll region 121 of the movie list, display in the scroll region 121 that is displayed in the virtual object 51 is scrolled.

As described above, in a case where the scroll region 121 is present in the virtual object 51, scroll-display inside the scroll region is preferentially performed than movement of the virtual object 51 itself. Additionally, in a case where the virtual object 51 itself is desired to be moved, a pushing operation, a dragging operation or the like is only required to be performed while touching other than the scroll region. Additionally, in a case where a scroll direction of the scroll region in the virtual object 51 is only a horizontal direction, the virtual object 51 may be moved in a vertical direction in response to a pushing operation, a dragging operation or the like being performed in the vertical direction with the scroll region touched.

The user who cannot decide on which movie to watch considers deciding on the movie by discussing with a family member who is at another table. If the user then utters "add magnetism to cup", such an utterance is speech-recognized and is detected as an uttered operation, and magnetism is added to the cup 61, which is a real object, in response to the uttered operation. Additionally, if magnetism is assumed to be set in advance also in the movie list (the virtual object 51), the cup 61 and the movie list are coupled with each other in response to an operation of bringing the cup 61 close to the movie list.

If the user raises the cup 61 from the table, moves to the other table where the family member is at, and places the cup 61 on the destination table, the movie list coupled with the cup 61 is displayed on the destination table. Here, if the user performs an operation of separating the cup 61 and the movie list, coupling between the two is released.

If the user who decided on which movie to watch by discussing with the family member selects one movie in the movie list by performing a tapping operation, playback of the movie is started on the virtual object 51 serving as the movie list on the table. Additionally, the movie does not have to be played back on the virtual object 51 as the movie list, and a new virtual object 51 may be displayed on the table, and the movie may be played back on the new virtual object 51.

In a case where the user who wants to pause playback of the movie being viewed places the cup 61 on the virtual object 51 where the movie is being played back, playback of the movie may be paused in response to such an operation. Then, in a case where the cup 61 is raised again, playback of the movie, which is paused, may be started in response to such an operation.

Then, if the user decides to watch the movie on a wall surface instead of on the table, the virtual object 51 may be attached on the wall and playback of the movie may be continued on the virtual object 51 that is attached on the wall in response to a gesture operation of holding and grasping the virtual object 51 playing back the movie in a hand and throwing the virtual object 51 at the wall. The user may thereby view the movie on the wall surface.

However, to attach the virtual object 51 on the wall, adhesiveness has to be set in advance in the virtual object 51, or magnetism has to be set in both the virtual object 51 and the wall. Additionally, in a case where the wall where the virtual object 51 is attached is sufficiently large, the virtual object 51 that is attached may be automatically expanded to a size suitable for watching the movie.

If the user who wants to subtly adjust the position of the virtual object 51 which is playing back the movie while being attached to the wall pulls on the cord 91 (FIG. 23) extending from the virtual object 51 along the wall, the display position of the virtual object 51 may be intuitively adjusted. Of course, the user may also adjust the position by moving close to the wall and operating the virtual object 51, or by performing an operation using a shadow.

When the movie ends, display on the virtual object 51 may return to the movie list, or the virtual object 51 attached to the wall may be erased. Furthermore, the adhesiveness or the magnetism of the virtual object 51 may be gradually weakened, and display may be performed until the virtual object 51 falls off the wall to the floor, and then, display of the virtual object 51 may be erased on the floor.

Additionally, in a case where display of the virtual object 51 is changed in response to various operations of the user, records may be saved in a reproducible manner. For example, the records may be read out in response to an utterance of the user, "where is the note (the virtual object 51 functioning as the note) which was here yesterday?", and actions of the virtual object 51 functioning as the note, from the day before to a current time point, may be reproduced.

<11. Virtual Object Control Process>

Next, a virtual object control process as an example of an information processing method of the VR system 10 will be described.

Figure 26:
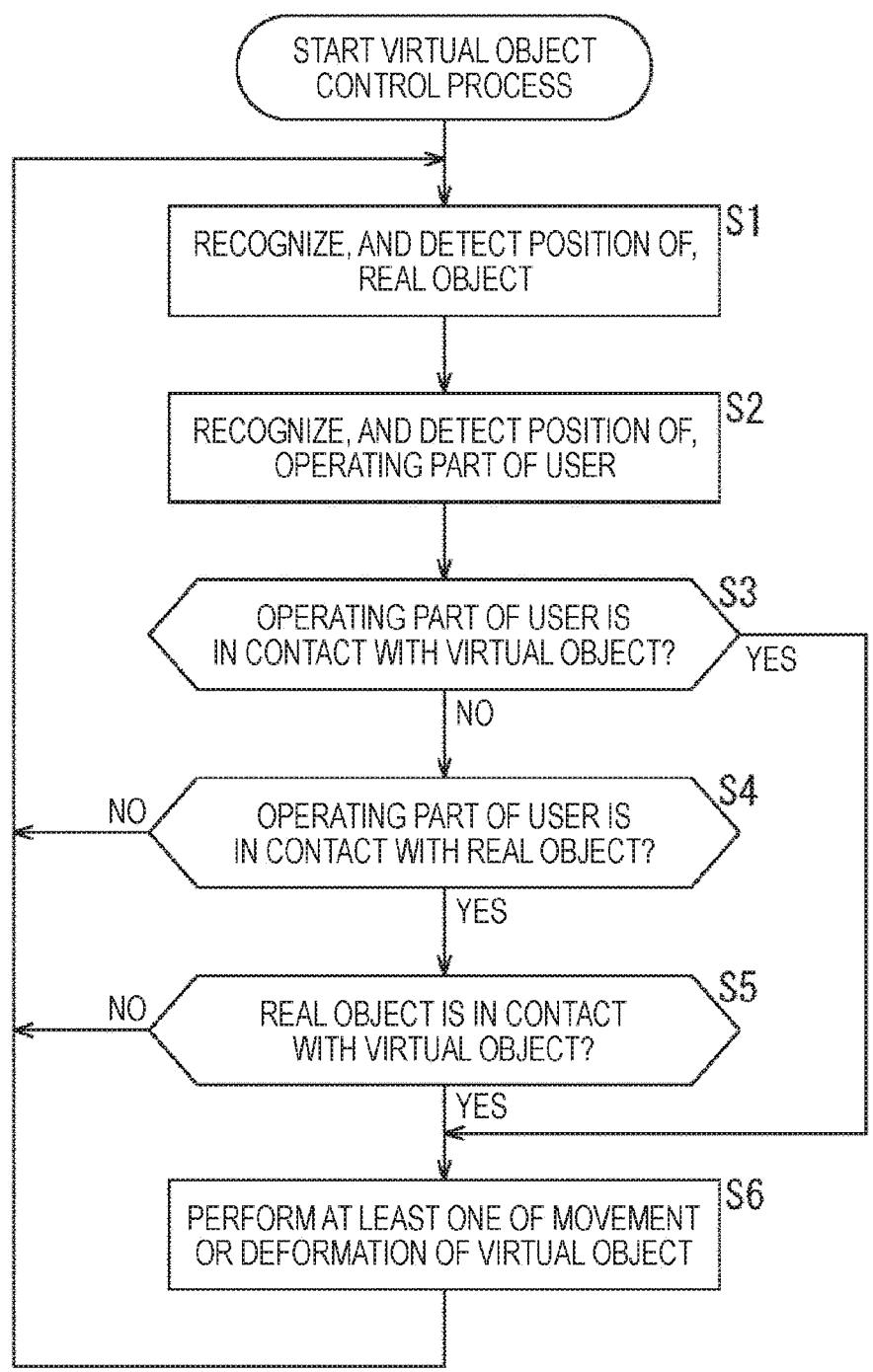
FIG. 26 is a flowchart describing an image object control process.

FIG. 26 is a flowchart describing the virtual object control process. The virtual object control process is a process of moving or deforming the virtual object 51 that is displayed, in response to an operation of the user.

Additionally, the virtual object control process assumes that the virtual object 51 is already displayed on the table or the like in the real space. Furthermore, a physical property is assumed to be set in the virtual object 51.

In step S1, the image recognition unit 21 recognizes a real object existing in the real space, on the basis of a moving image signal that is supplied from the depth camera 31. Here, for example, the cup 61 is assumed to be recognized as the real object. The positional relationship detection unit 22 detects a position of the recognized cup 61 in the real space.

In step S2, the image recognition unit 21 recognizes the instructing part 2 of the user as the operating tool existing in the real space, on the basis of the moving image signal that is supplied from the depth camera 31. The positional relationship detection unit 22 detects a position of the recognized instructing part 2 of the user in the real space.

In step S3, the positional relationship detection unit 22 determines whether or not the instructing part 2 of the user is in contact with the virtual object 51. However, the virtual object 51 does not actually exist, and contact of the instructing part 2 of the user with the virtual object 51 is determined in a case where a distance between the position of the virtual object 51 and the position of the instructing part 2 of the user is equal to or smaller than a predetermined threshold.

In a case where it is determined, in step S3, that the instructing part 2 of the user is not in contact with the virtual object 51, the process proceeds to step S4.

In step S4, the positional relationship detection unit 22 determines whether or not the instructing part 2 of the user is in contact with the real object (in this case, the cup 61). In a case where it is determined, in step S4, that the instructing part 2 of the user is not in contact with the real object, the user is not performing an operation on the virtual object 51 directly or indirectly, and thus, the process is returned to step S1 to be repeated therefrom.

In a case where it is determined, in step S4, that the instructing part 2 of the user is in contact with the real object, the user is possibly indirectly performing an operation on the virtual object 51 using the real object, and thus, the process proceeds to step S5.

In step S5, the positional relationship detection unit 22 determines whether or not the real object that is in contact with the instructing part 2 of the user is in contact with the virtual object 51. In a case where it is determined, in step S5, that the real object that is in contact with the instructing part 2 of the user is not in contact with the virtual object 51, there is no possibility of the user indirectly performing an operation on the virtual object 51 using the real object, and thus, the process returns to step S1 to be repeated therefrom.

In a case where it is determined, in step S5, that the real object that is in contact with the instructing part 2 of the user is in contact with the virtual object 51, the user is indirectly performing an operation on the virtual object 51 using the real object, and thus, the process proceeds to step S6.

In step S6, the operation detection unit 23 detects an operation of the user on the virtual object 51. The projection image generation unit 25 changes display of the virtual object 51 according to a detection result of the operation of the user. That is, a video signal for expressing at least one of movement or deformation is generated. The virtual object 51 that is already displayed is moved or deformed by the projector 33 displaying the virtual object 51 on the basis of the video signal. Then, the process returns to step S1 to be repeated therefrom.

Additionally, in a case where it is determined, in step S3, that the instructing part 2 of the user is in contact with the virtual object 51, the user is directly performing an operation on the virtual object 51 using the instructing part 2 as an operating tool, and thus, steps S4 and S5 are skipped, and the process proceeds to step S6. Then, the process returns to step S1 to be repeated therefrom. The description of the virtual object control process is hereby ended.

<12. Summary>

As described above, with the VR system 10 according to the present embodiment, various physical properties may be set in the virtual object 51, and operations on the virtual object 51 and resulting movement, deformation and the like of the virtual object 51 may be expressed in a manner similar to that in the case of a real object. Accordingly, a user may intuitively operate the virtual object 51 in a manner similar to that in the case of a real object.

Furthermore, with the VR system 10, expression of movement of the virtual object 51, deformation of the virtual object 51, audio generated by the virtual object 51 and the like are changed according to the physical property that is set, and thus, a user may easily recognize the physical property that is set in the virtual object 51.

Now, the series of processes by the information processing apparatus 20 described above may be implemented by hardware, or may be implemented by software. In other words, the functional blocks shown in FIG. 2 may be configured by hardware, or may be implemented by software.

In the case of implementing the series of processes by software, programs constituting the software are installed in a computer. The computer here may be a computer embedded in dedicated hardware, a general-purpose personal computer which is capable of implementing various functions by installation of various programs, or the like, for example.

Figure 27:
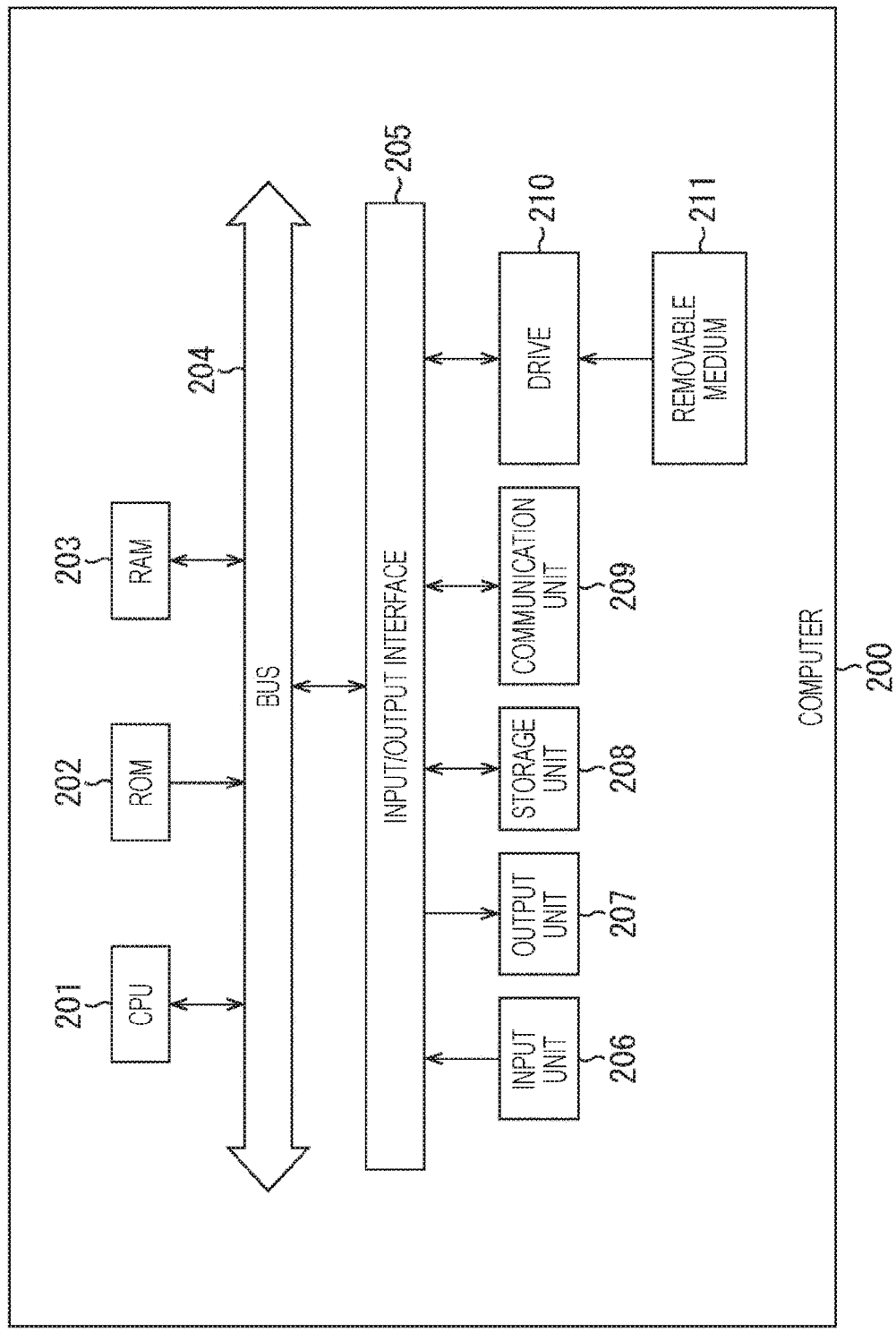
FIG. 27 is a block diagram showing an example configuration of a computer.

FIG. 27 is a block diagram showing an example configuration of hardware of a computer that performs the series of processes described above by programs.

In a computer 200, a central processing unit (CPU) 201, a read only memory (ROM) 202, and a random access memory (RAM) 203 are interconnected by a bus 204.

An input/output interface 205 is further connected to the bus 204. An input unit 206, an output unit 207, a storage unit 208, a communication unit 209, and a drive 210 are connected to the input/output interface 205.

The input unit 206 includes a keyboard, a mouse, a microphone and the like. The output unit 207 includes a display, a speaker and the like. The storage unit 208 includes a hard disk, a non-volatile memory and the like. The communication unit 209 includes a network interface and the like. The drive 210 drives a removable medium 211 such as a magnetic disk, an optical disk, a magneto-optical disk, a semiconductor memory or the like.

With the computer 200 configured in the above manner, the series of processes described above is performed by the CPU 201 loading the programs stored in the storage unit 208 into the RAM 203 via the input/output interface 205 and the bus 204, and executing the programs, for example.

Programs to be executed by the computer 200 (the CPU 201) may be provided by being recorded in the removable medium 211 as a package medium or the like, for example. The programs may also be provided through a wired or wireless transmission medium such as a local area network, the Internet or digital satellite broadcasting.

With the computer 200, programs may be installed in the storage unit 208 through the input/output interface 205, by mounting the removable medium 211 in the drive 210. The programs may also be received by the communication unit 209 through a wired or wireless transmission medium, and be installed in the storage unit 208. Moreover, the programs may be installed in advance in the ROM 202 or the storage unit 208.

Additionally, the programs to be executed by the computer 200 may be programs according to which processes are chronologically performed in the order described in the present specification, or may be programs according to which processes are performed in parallel or at required timings such as when invoked.

Additionally, effects described in the present specification are merely exemplary and are not restrictive, and other effects may also be achieved.

The embodiment of the present technology is not limited to the embodiment described above, and various modifications may be made within the scope of the present technology.

The present technology may also be configured in the following manner.

(1)

An information processing apparatus including:

a physical property setting unit configured to set a physical property in a virtual object that can be viewed together with an operating tool and a real object existing in a real space;

a positional relationship detection unit configured to detect a virtual positional relationship among the operating tool, the real object and the virtual object; and a virtual object changing unit configured to change display of the virtual object on the basis of the virtual positional relationship that is detected.

(2)

The information processing apparatus according to (1) described above, in which the virtual object changing unit is configured to change the display of the virtual object on the basis of the physical property that is set.

(3)

The information processing apparatus according to (1) or (2) described above, further including an operation detection unit configured to detect an operation on the virtual object by the operating tool, on the basis of the virtual positional relationship among the operating tool, the real object and the virtual object.

(4)

The information processing apparatus according to any one of (1) to (3) described above, in which the virtual object changing unit is configured to change the display of the virtual object to enable a user to recognize the physical property that is set.

(5)

The information processing apparatus according to any one of (1) to (4), further including a notification unit configured to issue a notification such that a user is enabled to recognize the physical property that is set.

(6)

The information processing apparatus according to any one of (1) to (5) described above, in which the physical property setting unit is configured to set, as the physical property, at least one of mass, a center of gravity, rigidity, magnetism, adhesiveness, a coefficient of friction, fragility, heat resistance or solubility.

(7)

The information processing apparatus according to (3) described above, in which the operation detection unit is configured to detect, as the operation on the virtual object, at least one of an operation of pushing, an operation of dragging, an operation of twisting, an operation of tugging, a gesture operation, an operation using a shadow, an operation of grasping, an operation of throwing, an operation of rolling up, an operation of folding, an operation of tearing, an operation of scraping, an operation of wiping, an operation of dropping, an operation of stacking, an operation of turning over, an operation of turning, an operation of causing to stand upright, an utterance operation or a cancel operation.

(8)

The information processing apparatus according to any one of (1) to (7) described above, in which the virtual object changing unit changes the display of the virtual object by adding a physical simulation effect to the virtual object on the basis of the physical property.

(9)

The information processing apparatus according to (3) described above, in which the operation detection unit is configured to detect the operation that is directly performed on the virtual object by using the operating tool.

(10)

The information processing apparatus according to (3) described above, in which the operation detection unit is configured to detect the operation that is indirectly performed on the virtual object by using the real object or another virtual object.

(11)

The information processing apparatus according to (3) described above, in which the operation detection unit is configured to detect the operation on the basis of a moving image signal obtained by capturing the real space.

(12)

An information processing method of an information processing apparatus, the method including:

a physical property setting step of setting a physical property in a virtual object that can be viewed together with an operating tool and a real object existing in a real space;

a positional relationship detection step of detecting a virtual positional relationship among the operating tool, the real object and the virtual object; and a virtual object changing step of changing display of the virtual object on the basis of the virtual positional relationship that is detected, in which the steps are performed by the information processing apparatus.

(13)

A program for causing a computer to function as:

a physical property setting unit configured to set a physical property in a virtual object that can be viewed together with an operating tool and a real object existing in a real space;

a positional relationship detection unit configured to detect a virtual positional relationship among the operating tool, the real object and the virtual object; and a virtual object changing unit configured to change display of the virtual object on the basis of the virtual positional relationship that is detected.

REFERENCE SIGNS LIST

2 Instructing part
10 VR system
20 Information processing apparatus
21 Image recognition unit
22 Positional relationship detection unit
23 Operation detection unit
24 Audio recognition unit
25 Projection image generation unit
26 Audio output unit
31 Depth camera
32 Microphone
33 Projector
34 Speaker 41 Control target appliance
51 Virtual object
61 Cup
62 Pin
71 Magnet
72 Magnetic line
81 Glue
82 Luster
91 Cord
111 Shadow
121 Scroll region
122 Scroll bar
200 Computer
201 CPU

The invention claimed is:

1. An information processing apparatus, comprising:
circuitry configured to:
set a physical property in a virtual object, wherein
the virtual object is viewable with an operating tool and a real object in a real space, and
the physical property in the virtual object is one of a center of gravity, rigidity, magnetism, adhesiveness, a coefficient of friction, fragility, heat resistance, or solubility;
add a physical simulation effect to the virtual object based on the set physical property in the virtual object;
determine at least one of an amount of deformation of the virtual object or an amount of movement of the virtual object based on the added physical simulation effect;
detect a virtual positional relationship among the operating tool, the real object, and the virtual object; and
change a display of the virtual object based on the detected virtual positional relationship and the determined at least one of the amount of deformation of the virtual object or the amount of movement of the virtual object.

2. The information processing apparatus according to claim 1, the circuitry is further configured to detect an operation on the virtual object by the operating tool, based on the virtual positional relationship among the operating tool, the real object, and the virtual object.

3. The information processing apparatus according to claim 1, wherein the circuitry is further configured to change the display of the virtual object to enable a user to recognize the set physical property.

4. The information processing apparatus according to claim 1, wherein the circuitry is further configured to issue a notification such that a user is enabled to recognize the set physical property.

5. The information processing apparatus according to claim 2, wherein the circuitry is further configured to detect, as the operation on the virtual object, at least one of a push operation, a drag operation, a twist operation, a tug operation, a gesture operation, an operation by use of a shadow, a grasp operation, a throw operation, a roll-up operation, a fold operation, a tear operation, a scrap operation, a wipe operation, a drop operation, a stack operation, a turn-over operation, a turn operation, an operation to stand upright, an utterance operation or a cancel operation.

6. The information processing apparatus according to claim 2, wherein the circuitry is further configured to detect the operation directly performed on the virtual object by use of the operating tool.

7. The information processing apparatus according to claim 2, wherein the circuitry is further configured to detect the operation indirectly performed on the virtual object by use of the real object or another virtual object.

8. The information processing apparatus according to claim 2, wherein the circuitry is further configured to detect the operation based on a moving image signal obtained by a capture of the real space.

9. An information processing method, comprising:
in an information processing apparatus that includes circuitry:
setting, by the circuitry, a physical property in a virtual object, wherein
the virtual object is viewable with an operating tool and a real object in a real space, and
the physical property in the virtual object is one of a center of gravity, rigidity, magnetism, adhesiveness, a coefficient of friction, fragility, heat resistance, or solubility;
adding, by the circuitry, a physical simulation effect to the virtual object based on the set physical property in the virtual object;
determining, by the circuitry, at least one of an amount of deformation of the virtual object or an amount of movement of the virtual object based on the added physical simulation effect;
detecting, by the circuitry, a virtual positional relationship among the operating tool, the real object, and the virtual object; and
changing, by the circuitry, a display of the virtual object based on the detected virtual positional relationship and the determined at least one of the amount of deformation of the virtual object or the amount of movement of the virtual object.

10. A non-transitory computer-readable medium having stored thereon computer-executable instructions which, when executed by a processor, cause the processor to execute operations, the operations comprising:
setting a physical property in a virtual object, wherein
the virtual object is viewable with an operating tool and a real object in a real space, and
the physical property in the virtual object is one of a center of gravity, rigidity, magnetism, adhesiveness, a coefficient of friction, fragility, heat resistance, or solubility;
adding a physical simulation effect to the virtual object based on the set physical property in the virtual object;
determining at least one of an amount of deformation of the virtual object or an amount of movement of the virtual object based on the added physical simulation effect;
detecting a virtual positional relationship among the operating tool, the real object, and the virtual object; and
changing a display of the virtual object based on the detected virtual positional relationship and the determined at least one of the amount of deformation of the virtual object or the amount of movement of the virtual object.

* * * * *